US012342858B2

(12) United States Patent
Lukan et al.

(10) Patent No.: US 12,342,858 B2
(45) Date of Patent: Jul. 1, 2025

(54) SECURITY FEATURES FOR AEROSOL GENERATION DEVICE

(71) Applicant: RAI STRATEGIC HOLDINGS, INC., Winston-Salem, NC (US)

(72) Inventors: Sean Lukan, Winston-Salem, NC (US); TJ Root, Winston-Salem, NC (US); Patrick Bailey, Winston-Salem, NC (US); Rae McNeil, Winston-Salem, NC (US); Benjamin Gatti, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 45 days.

(21) Appl. No.: 18/238,208

(22) Filed: Aug. 25, 2023

(65) Prior Publication Data

US 2023/0397662 A1 Dec. 14, 2023

Related U.S. Application Data

(63) Continuation of application No. 17/072,814, filed on Oct. 16, 2020, now Pat. No. 11,785,988.

(51) Int. Cl.
*A24F 40/40* (2020.01)
*A24F 40/60* (2020.01)
(Continued)

(52) U.S. Cl.
CPC .............. *A24F 40/40* (2020.01); *A24F 40/60* (2020.01); *E05B 59/00* (2013.01); *A24F 40/50* (2020.01)

(58) Field of Classification Search
CPC ........... A24F 40/40; A24F 40/60; A24F 40/49
See application file for complete search history.

(56) References Cited

U.S. PATENT DOCUMENTS 4,964,284 A * 10/1990 McDaid .................. E05B 67/36
70/DIG. 72
6,991,479 B2 * 1/2006 Miao .................. H01R 13/6397
439/352

(Continued)

FOREIGN PATENT DOCUMENTS

EP 3571942 A1 * 11/2019 ............. A24F 40/40
RU 2658215 C1 6/2018

(Continued)

OTHER PUBLICATIONS

International Search Report and Written Opinion dated Jan. 27, 2022 in International Application No. PCT/US2021/54893 filed Oct. 14, 2021.

(Continued)

*Primary Examiner* — Hae Moon Hyeon
(74) *Attorney, Agent, or Firm* — BURR & FORMAN LLP

(57) ABSTRACT

A security device for an aerosol generation device includes an engagement assembly configured to releasably engage a portion of the aerosol generation device and a locking assembly operably coupled to the engagement assembly. The locking assembly is configured to have a locked state in which the engagement assembly is affixed to the portion of the aerosol generation device, and an unlocked state in which the engagement assembly is released from being affixed to the portion of the aerosol generation device. The engagement assembly is further configured to perform a benefit denial function responsive to removal of the security device from the aerosol generation device.

18 Claims, 22 Drawing Sheets

(51) Int. Cl.
*E05B 59/00* (2006.01)
*A24F 40/50* (2020.01)

(56) References Cited

U.S. PATENT DOCUMENTS

| | | | | |
|---|---|---|---|---|
| 7,428,834 | B1 * | 9/2008 | Lee | H01R 13/443 439/304 |
| 7,677,065 | B1 * | 3/2010 | Miao | E05B 37/02 70/21 |
| 7,913,527 | B2 * | 3/2011 | Chen | G06F 21/85 70/57 |
| 8,596,103 | B2 * | 12/2013 | Weiershausen | E05B 37/025 70/315 |
| 8,845,355 | B2 * | 9/2014 | Litowitz | H01R 13/5213 439/357 |
| 10,870,163 | B1 * | 12/2020 | Pearman | H01R 4/70 |
| 11,291,246 | B2 * | 4/2022 | Huang | G07C 9/00563 |
| 11,785,988 | B2 * | 10/2023 | Lukan | E05B 59/00 131/329 |
| 2002/0000225 | A1 | 1/2002 | Schuler et al. | |
| 2009/0120962 | A1 | 5/2009 | Malorni et al. | |
| 2019/0197225 | A1 | 6/2019 | Khalifa et al. | |
| 2020/0138106 | A1 * | 5/2020 | Huang | A24F 40/60 |
| 2020/0206415 | A1 | 7/2020 | Woodbine et al. | |
| 2022/0117298 | A1 * | 4/2022 | Lukan | E05B 59/00 |
| 2022/0354185 | A1 | 11/2022 | Garris et al. | |
| 2022/0354186 | A1 | 11/2022 | Garris et al. | |
| 2023/0024704 | A1 | 1/2023 | Lukan et al. | |

FOREIGN PATENT DOCUMENTS

| | | | |
|---|---|---|---|
| WO | 2006095194 | A1 | 9/2006 |
| WO | 2020193177 | A1 | 10/2020 |

OTHER PUBLICATIONS

Extended European Search Report issued in corresponding European Patent Application No. 21881048.9 mailed Oct. 15, 2024, all pages cited in its entirety.

Decision to Grant and Search Report from corresponding RU Application No. 2023112467, mailed Apr. 7, 2025, all pages cited in its entirety.

* cited by examiner

FIG. 1B.
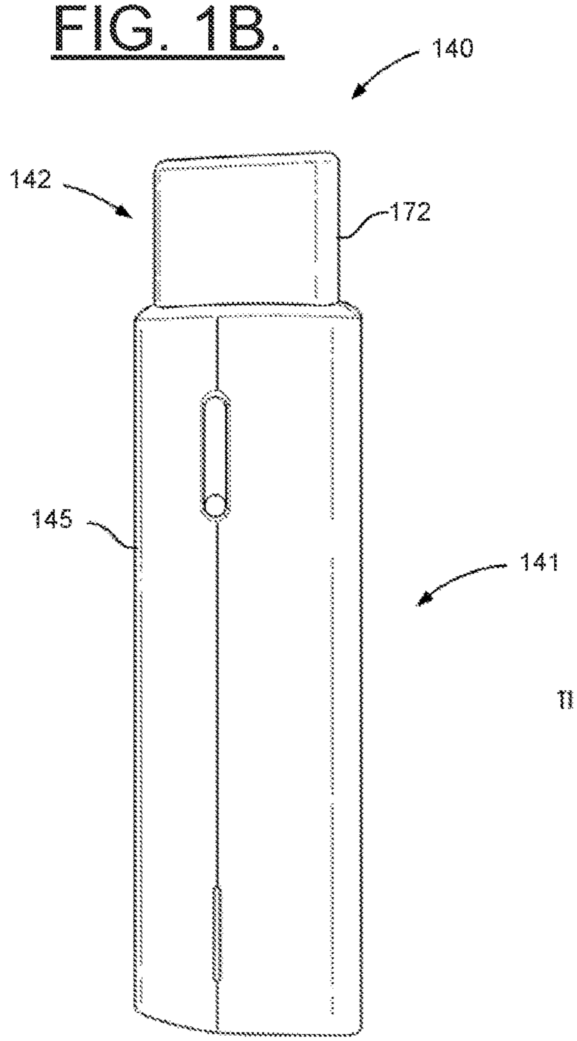
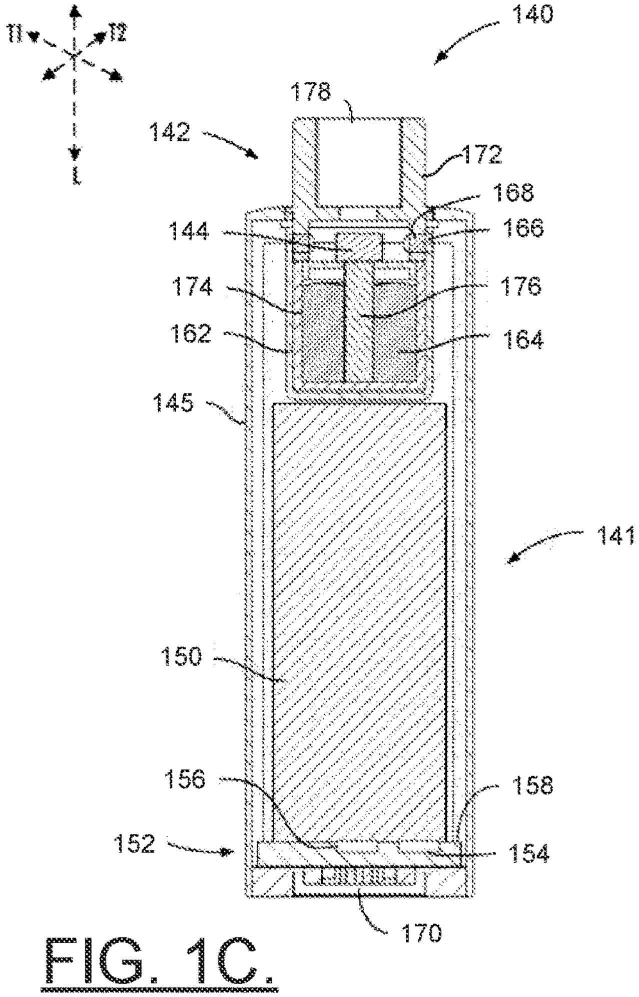
FIG. 1C.

FIG. 4C.
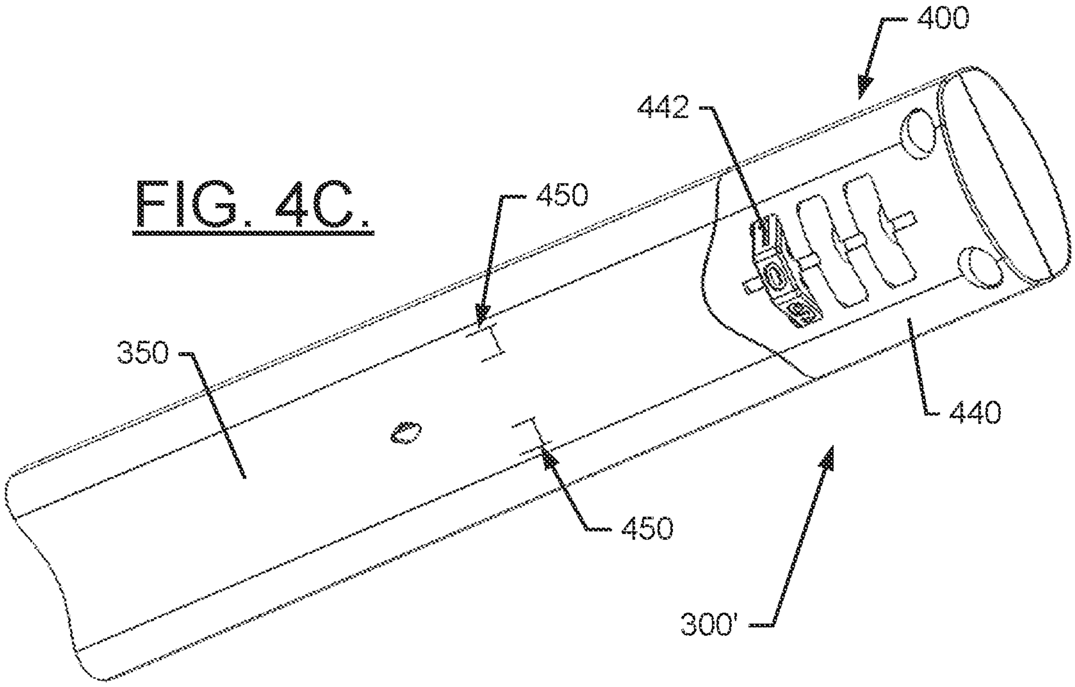
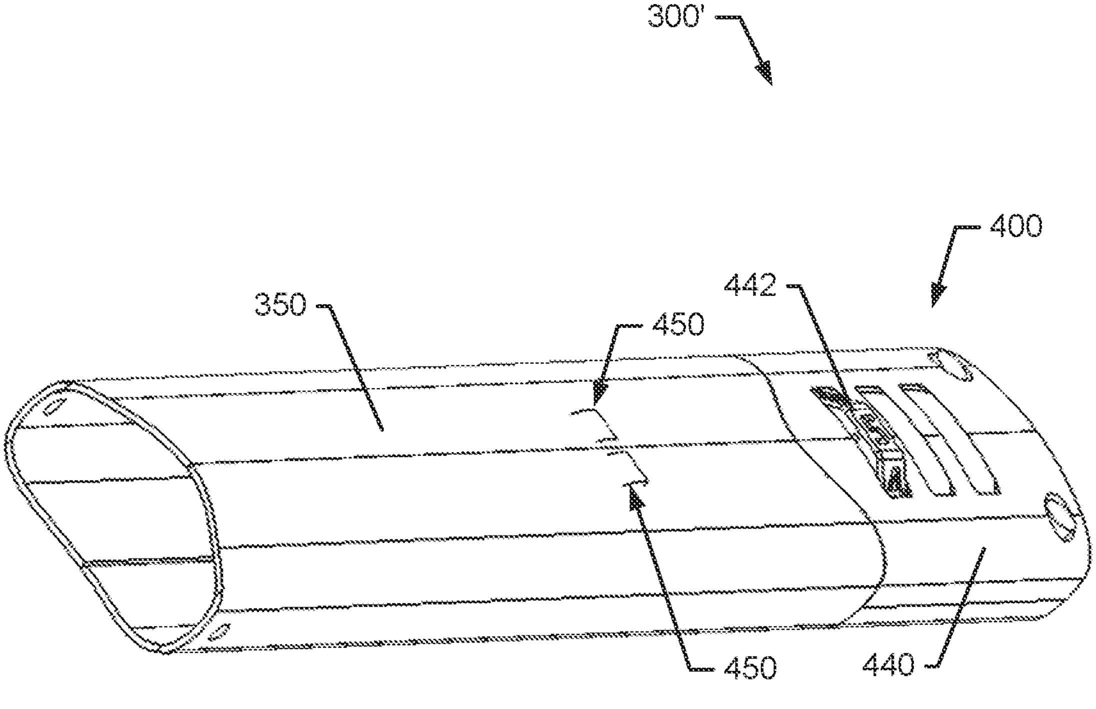
FIG. 4D.

FIG. 5A.
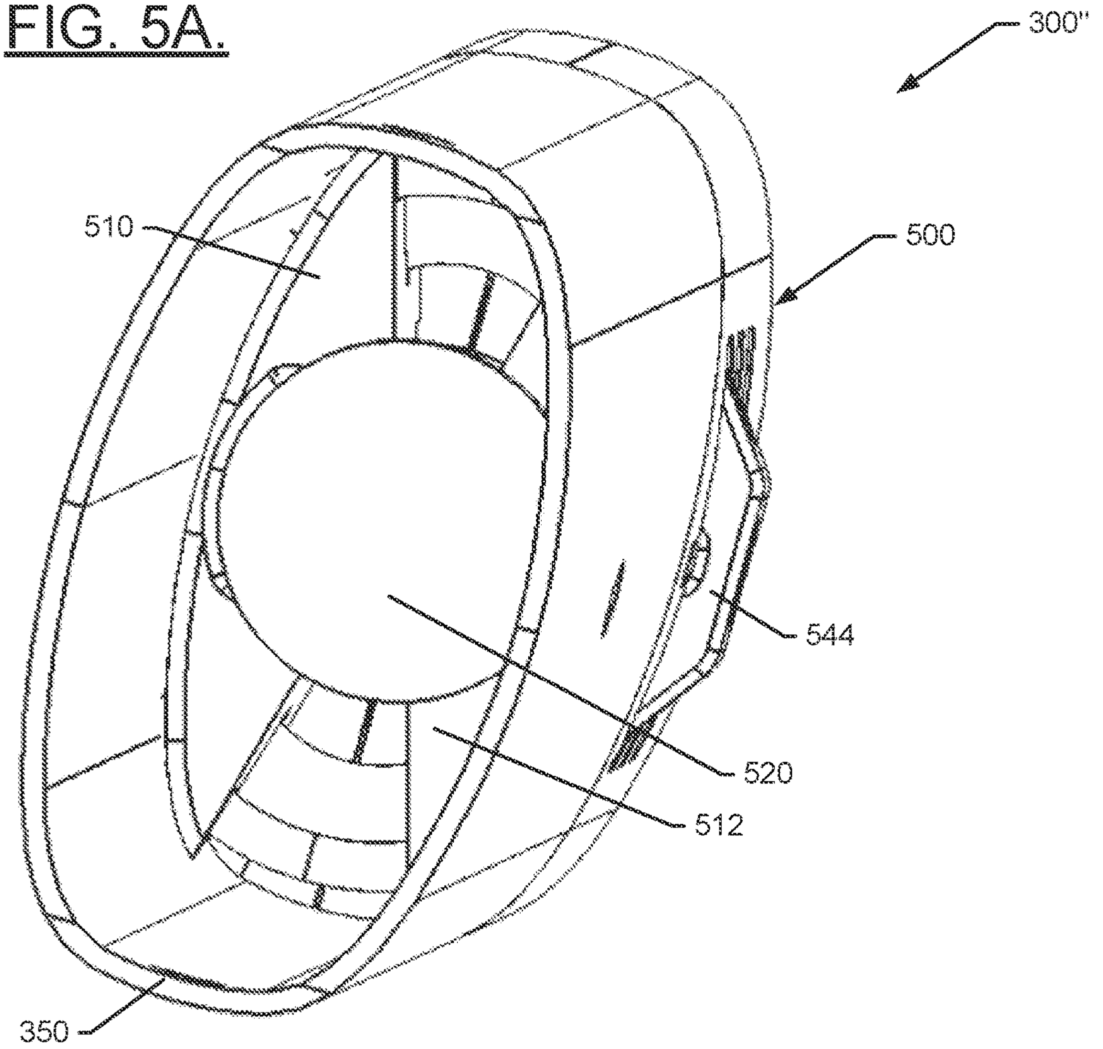
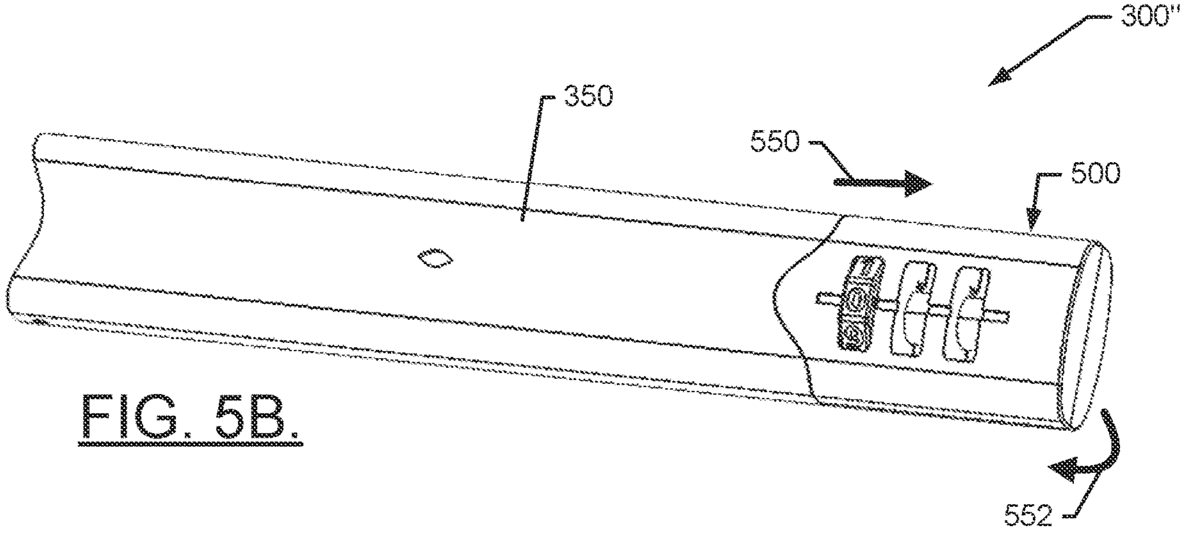
FIG. 5B.

FIG. 5C.
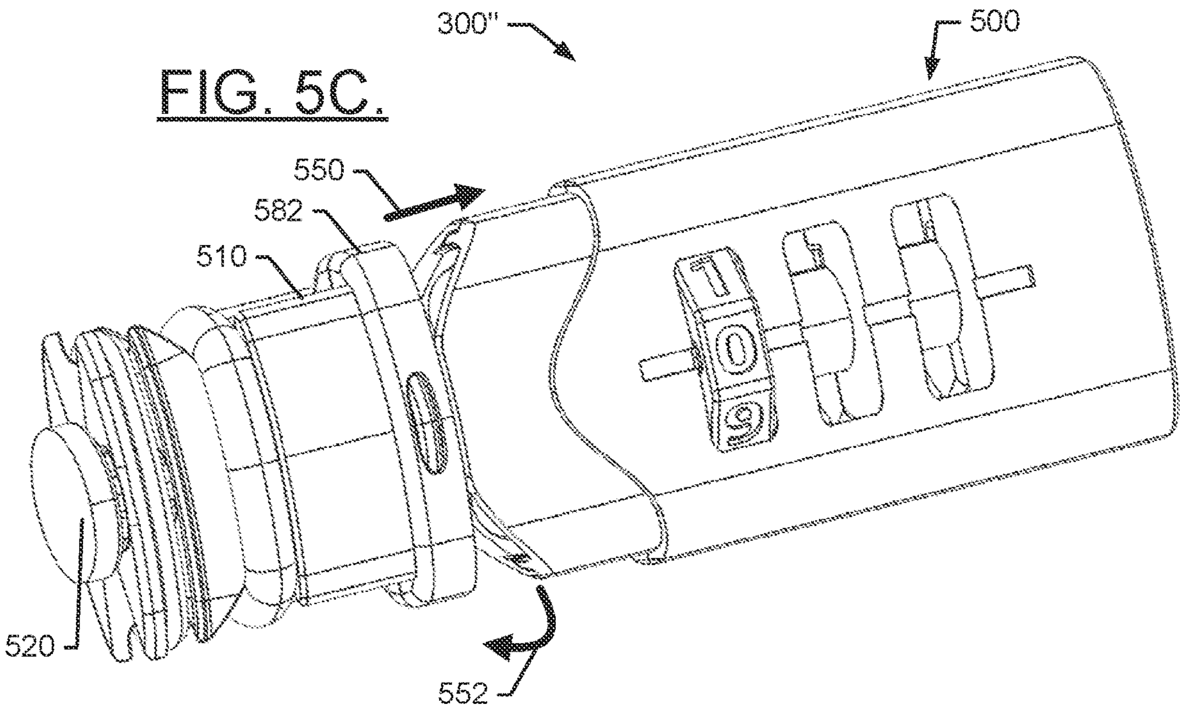
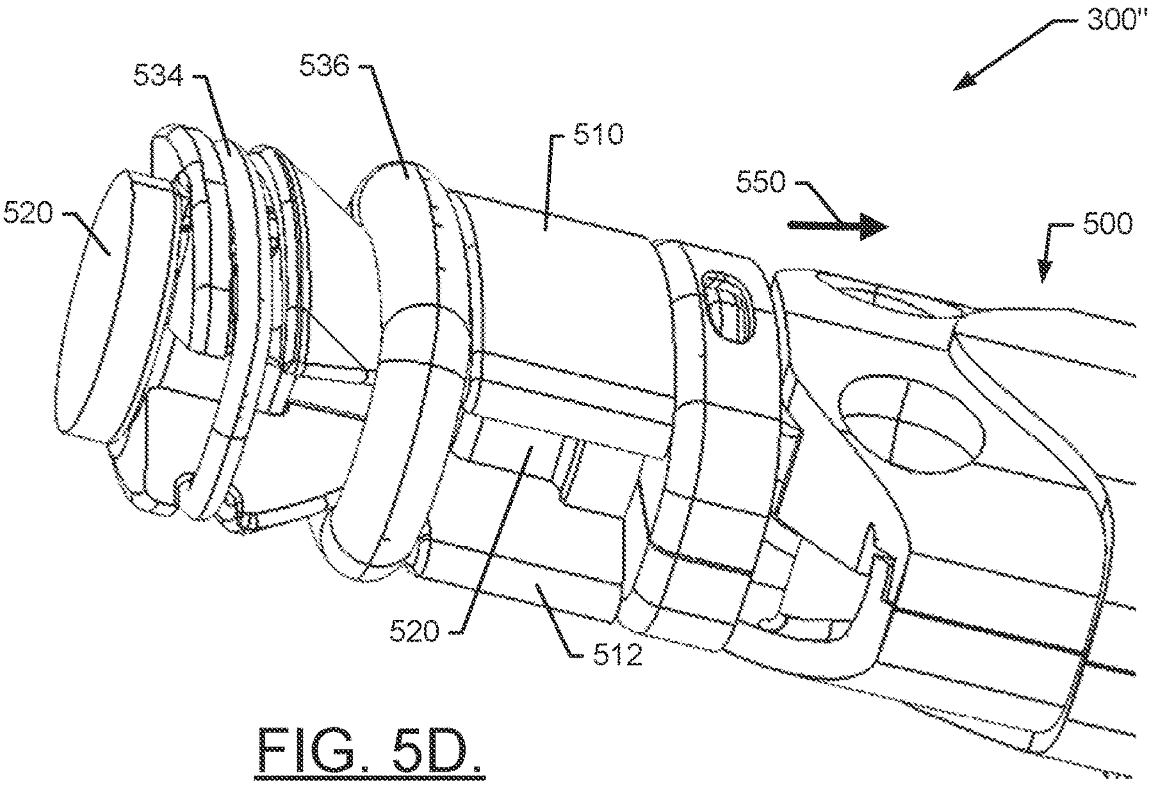
FIG. 5D.

FIG. 5E.
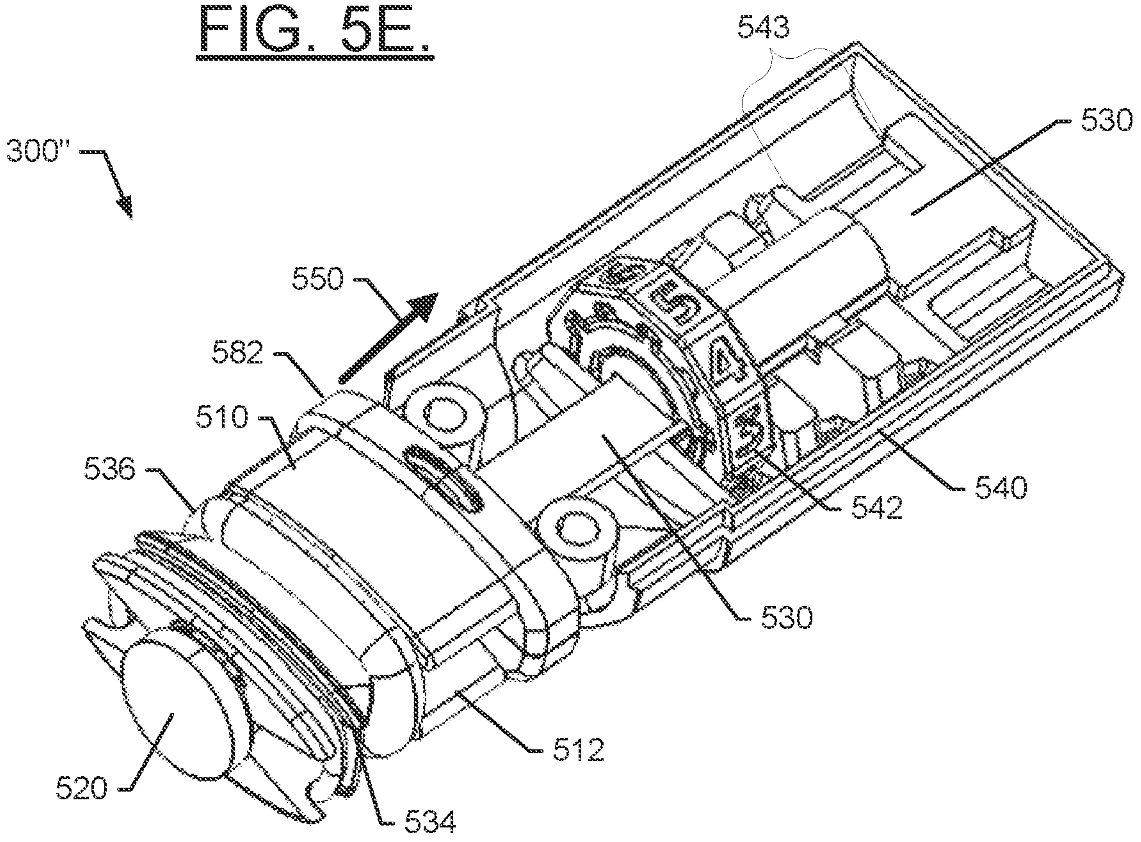
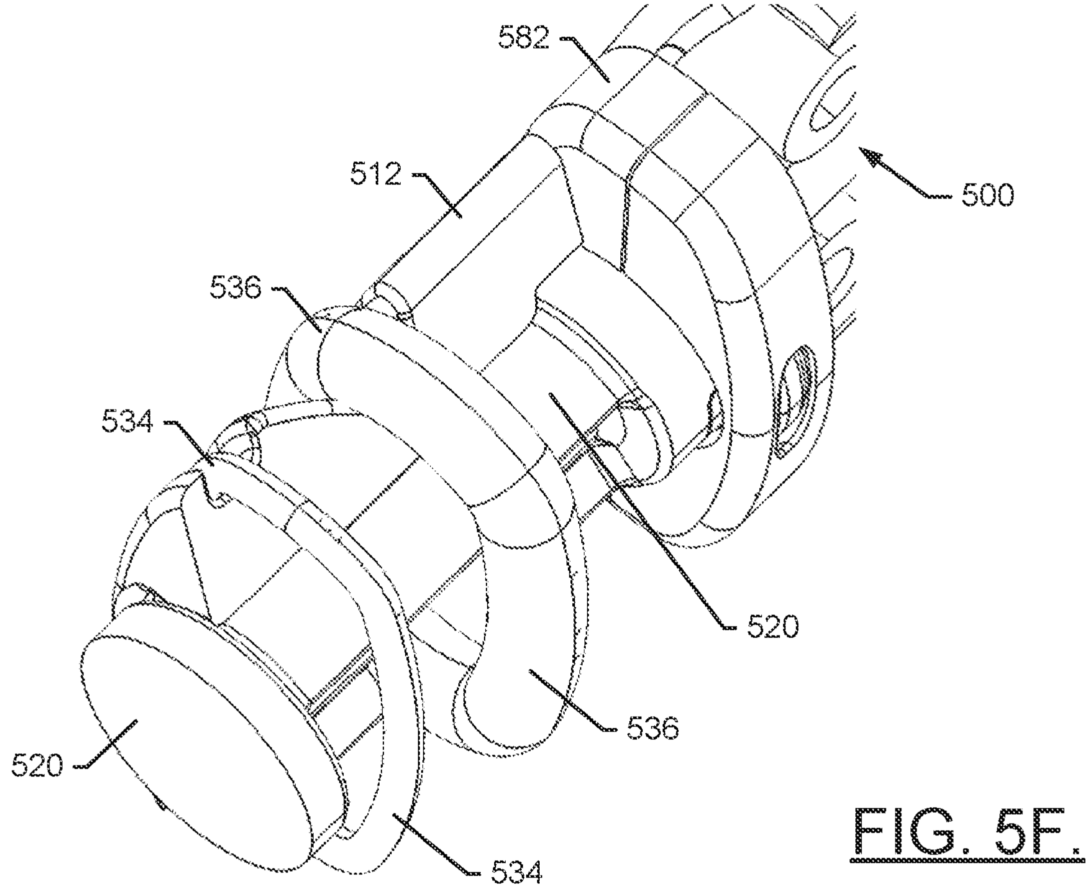
FIG. 5F.

FIG. 6A.
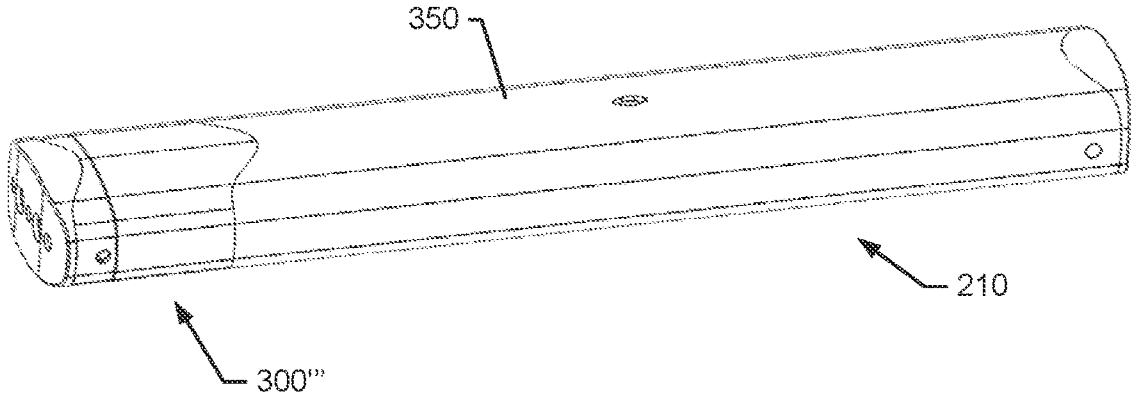
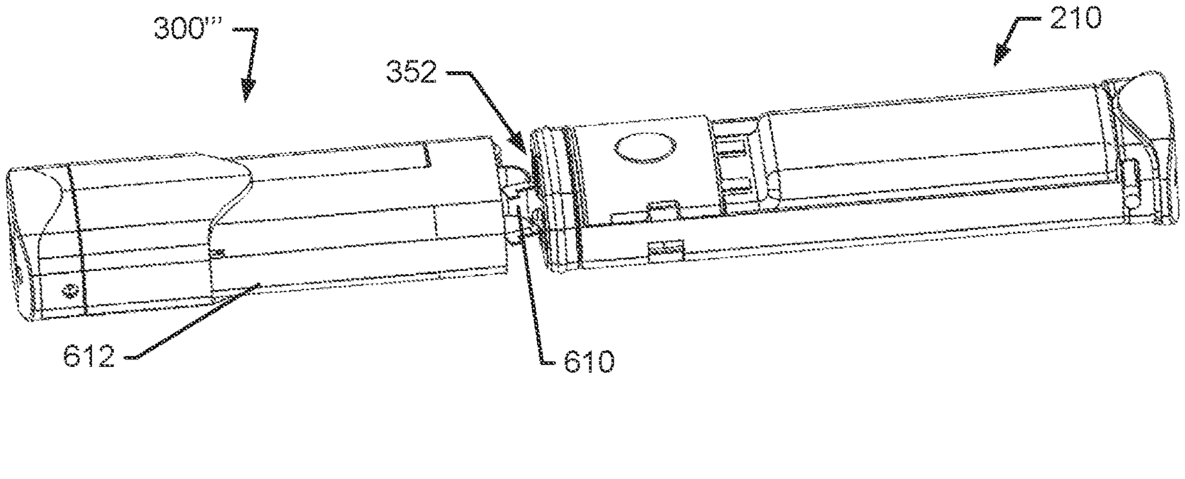
FIG. 6B.

FIG. 6D.
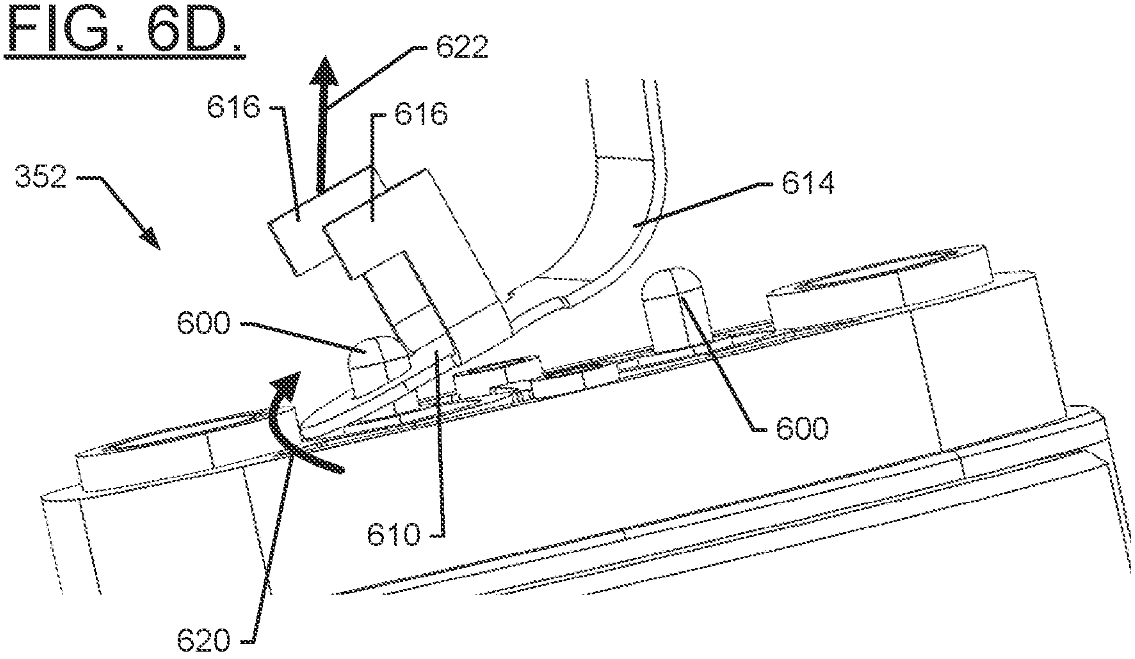
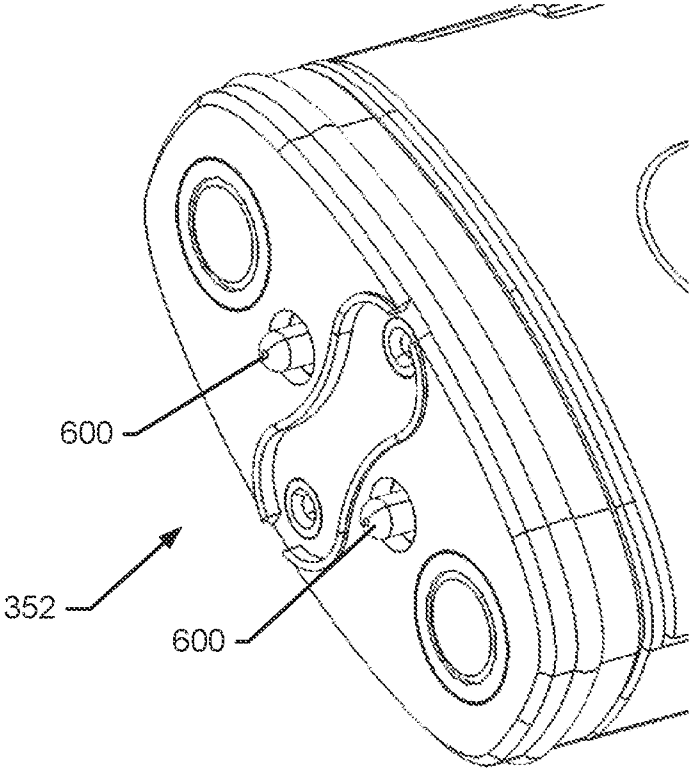
FIG. 6E.

FIG. 7A.
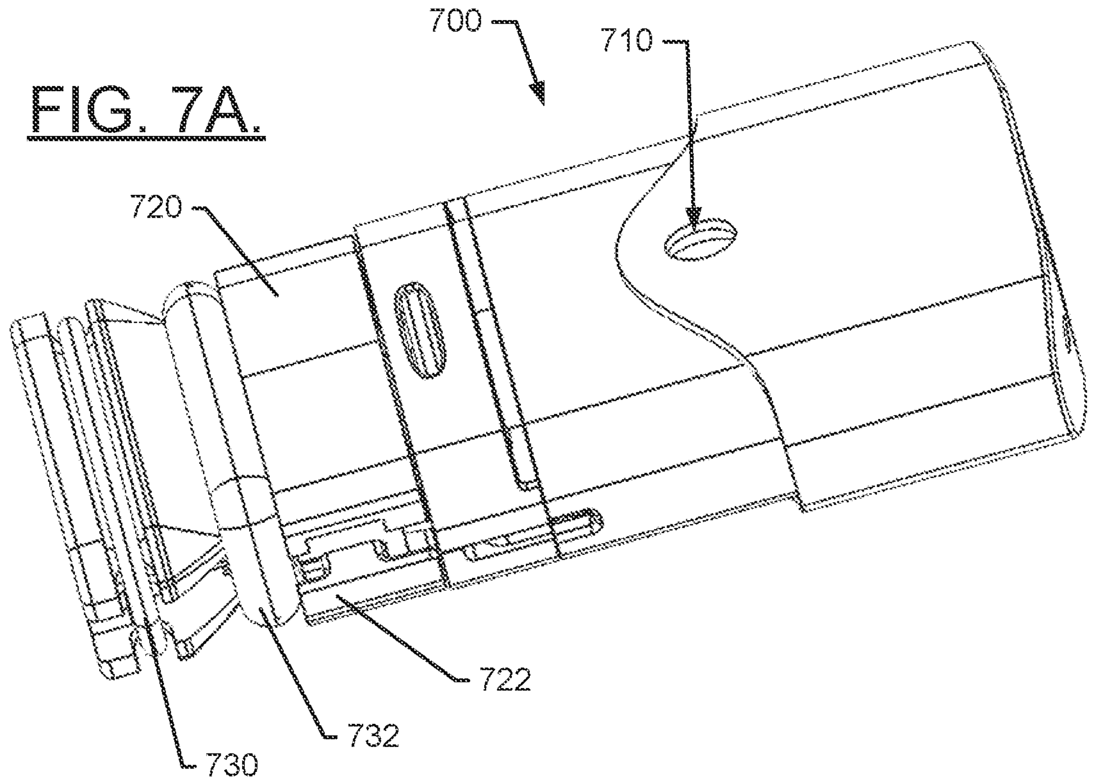
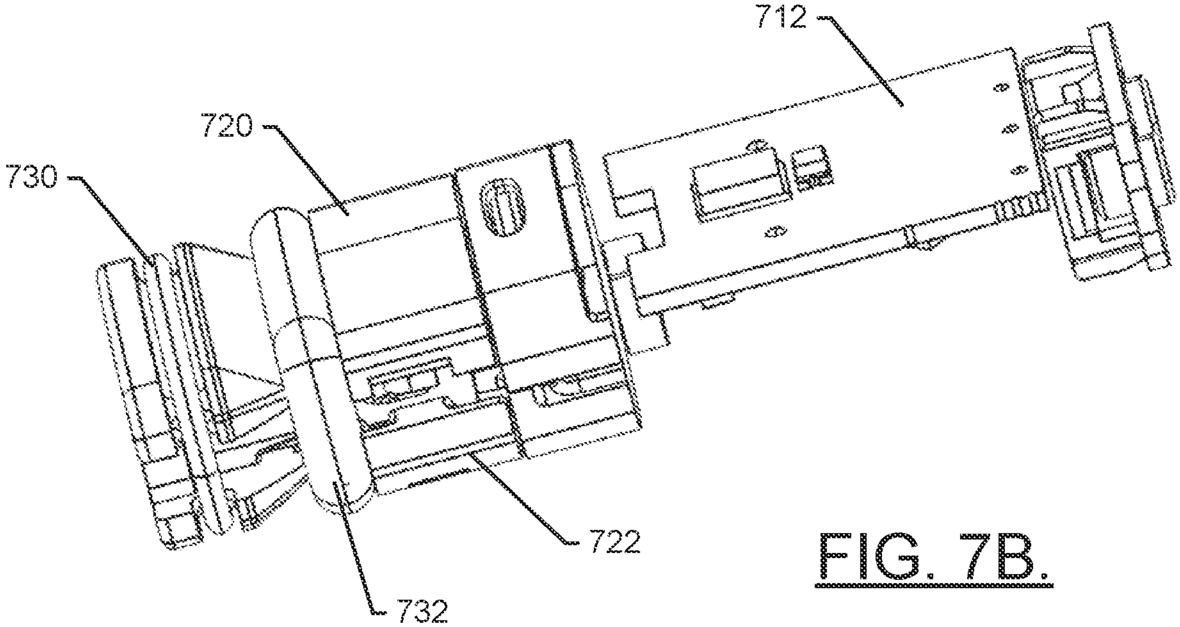
FIG. 7B.

SECURITY FEATURES FOR AEROSOL GENERATION DEVICE

CROSS-REFERENCE TO RELATED APPLICATIONS

The present application is a continuation of U.S. application Ser. No. 17/072,814, filed on Oct. 16, 2020, which is incorporated by reference herein in its entirety.

TECHNICAL FIELD

Example embodiments generally relate to non-combustible aerosol provision systems and, in particular, relate to security features for use with a non-combustible aerosol provision device.

BACKGROUND

Non-combustible aerosol provision systems (e.g., e-cigarettes/tobacco heating products or other such devices) generally contain an aerosolisable material, such as a reservoir of a source liquid containing a formulation. The formulation typically includes nicotine, or a solid material such as a tobacco-based product, from which an aerosol is generated for inhalation by a user, for example through heat vaporization. However, devices including formulations with other materials, such as cannabinoids (e.g., Tetrahydrocannabinol (THC) and/or Cannabidiol (CBD)), botanicals, medicinals, caffeine, and/or other active ingredients, are also possible. Thus, a non-combustible aerosol provision system will typically include an aerosol generation chamber containing a vaporizer, e.g., a heater, arranged to vaporize a portion of the aerosolisable material to generate an aerosol in the aerosol generation chamber. As a user inhales on a mouthpiece of the device and electrical power is supplied to the heater, air is drawn into the device and into the aerosol generation chamber where the air mixes with the vaporized aerosolisable material and forms a condensation aerosol. There is a flow path between the aerosol generation chamber and an opening in the mouthpiece so the air drawn through the aerosol generation chamber continues along the flow path to an opening in the mouthpiece, carrying some of the condensation aerosol with it, and out through the opening in the mouthpiece for inhalation by the user.

Aerosol provision systems include, for example, vapor products, such as those delivering nicotine that are commonly known as “electronic cigarettes,” “e-cigarettes” or electronic nicotine delivery systems (ENDS), as well as heat-not-burn products including tobacco heating products (THPs). Many of these products take the form of a system including a device and a consumable, and it is the consumable that includes the material from which the substance to be delivered originates. Typically, the device is reusable, and the consumable is single-use (although some consumables are refillable as in the case of so called “open” systems). Therefore, in many cases, the consumable is sold separately from the device, and often in a multipack. Moreover, subsystems and some individual components of devices or consumables may be sourced from specialist manufacturers.

Aerosol provision devices, like those described above, are generally sized to be hand-held. Due to the hand-held size and the popularity of these devices, they may sometimes become the object of theft or other unauthorized use. Prevention, or at least inhibition, of unauthorized use of aerosol provision devices, either due to theft or other reasons, is of significant interest to manufacturers of such devices. Thus, it may be desirable to provide convenient and effective ways to limit the unauthorized use of aerosol provision devices by adding various security features to such devices.

BRIEF SUMMARY OF SOME EXAMPLES

In an example embodiment, a security device for an aerosol generation device may be provided. The security device may include an engagement assembly configured to releasably engage a portion of the aerosol generation device and a locking assembly operably coupled to the engagement assembly. The locking assembly may be configured to have a locked state in which the engagement assembly is affixed to the portion of the aerosol generation device, and an unlocked state in which the engagement assembly is released from being affixed to the portion of the aerosol generation device. The engagement assembly may be further configured to perform a benefit denial function responsive to removal of the security device from the aerosol generation device.

In another example embodiment, a method of preventing unauthorized use of an aerosol generation device may be provided. The method may include applying a security device having an engagement assembly and a locking assembly to a portion of the aerosol generation device to which a consumable cartridge is otherwise attachable, and transitioning the locking assembly to a locked state in which the engagement assembly is affixed to the portion of the aerosol generation device. The method may further include, responsive to receipt of a key or code, transitioning the locking assembly to an unlocked state in which the engagement assembly is released from being affixed to the portion of the aerosol generation device, and performing a benefit denial function responsive to removal of the security device from the aerosol generation device when the locking assembly is in the locked state.

It will be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIGS. 1B and 1C illustrate an aerosol provision system in the form of a vapor product, according to some example implementations;

Figure 4A:
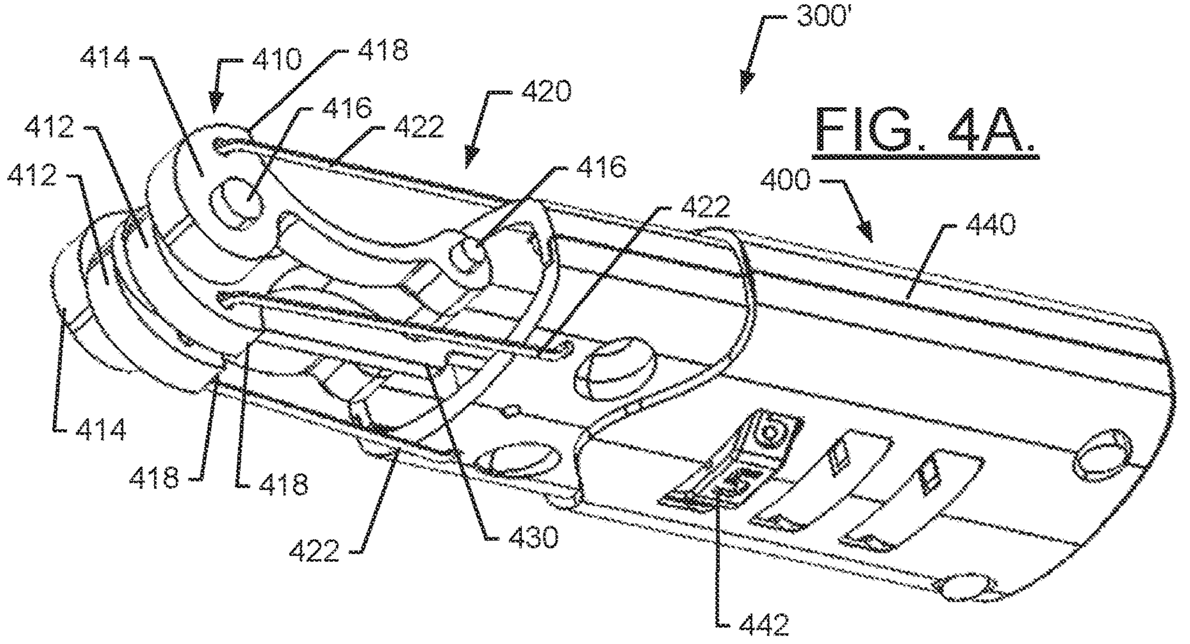
Figure 4B:
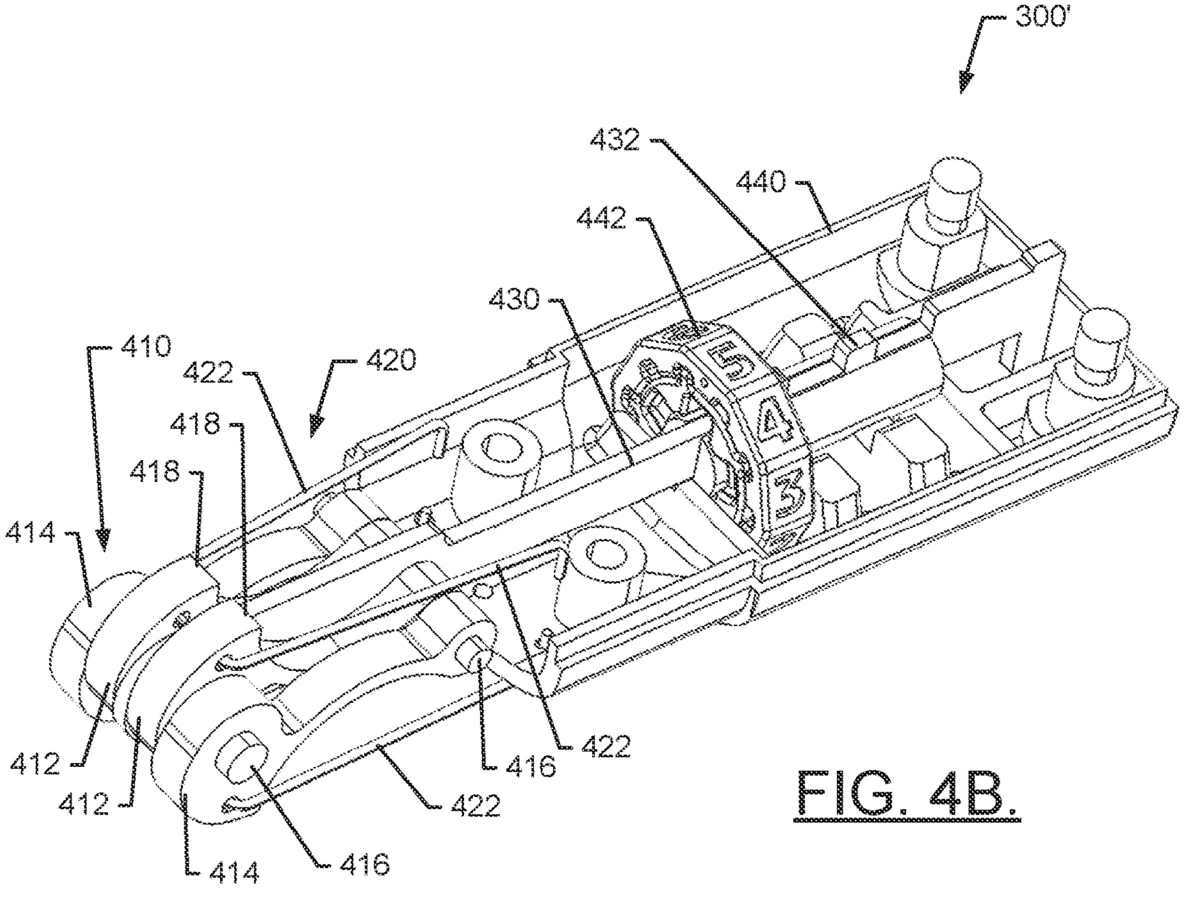
Figure 4E:
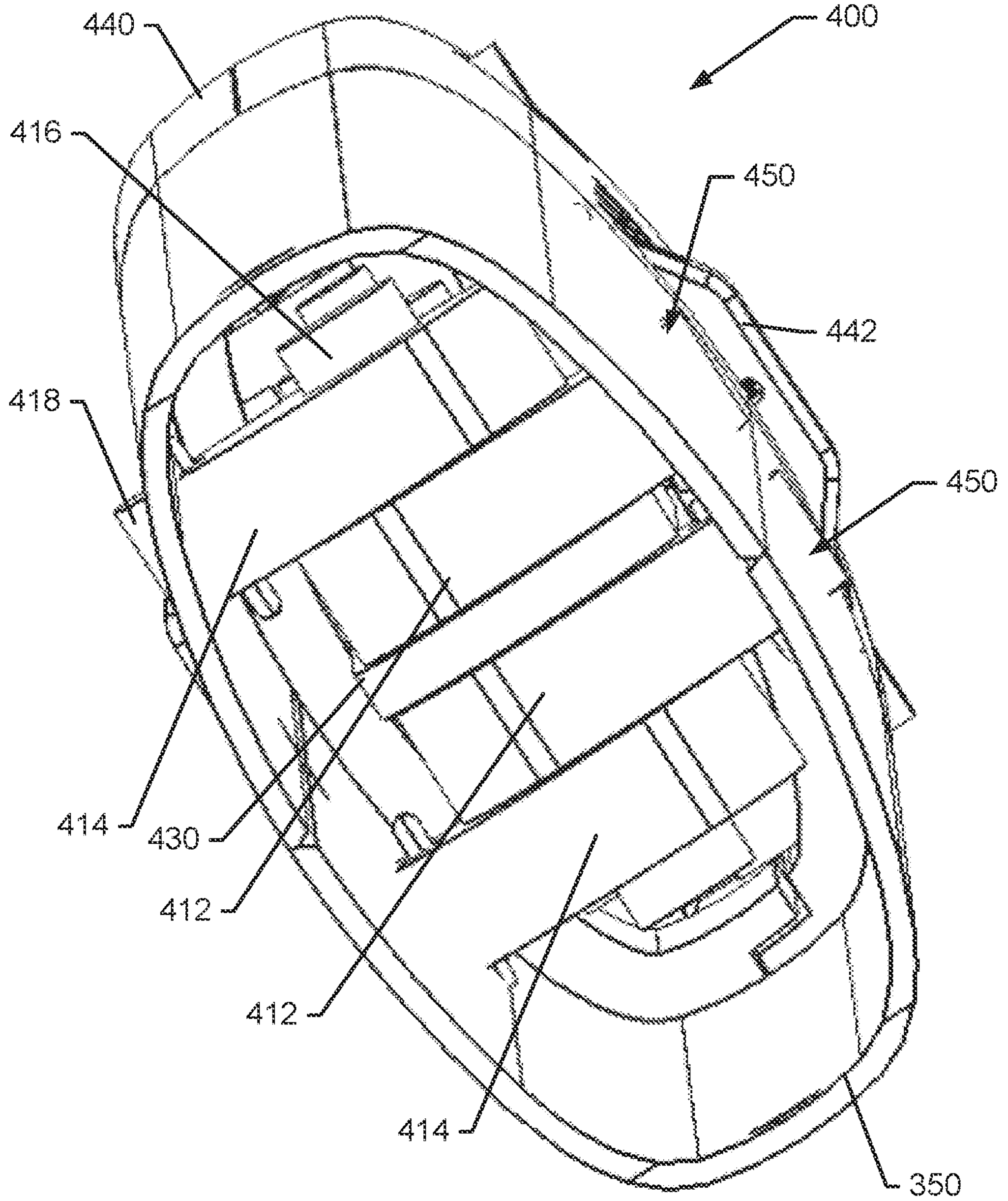
Figure 5G:
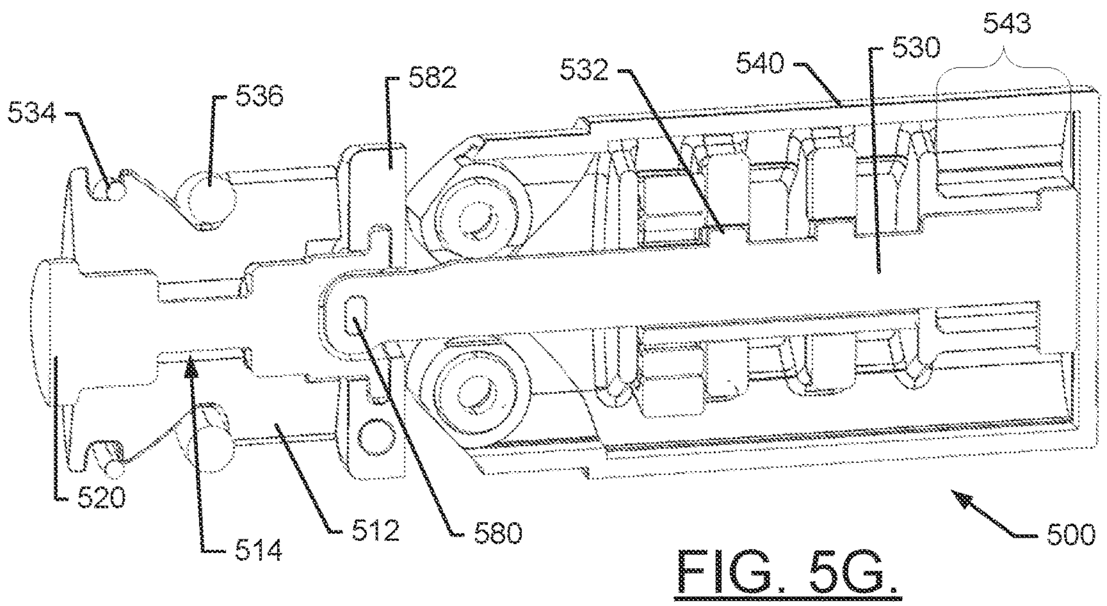
Figure 5H:
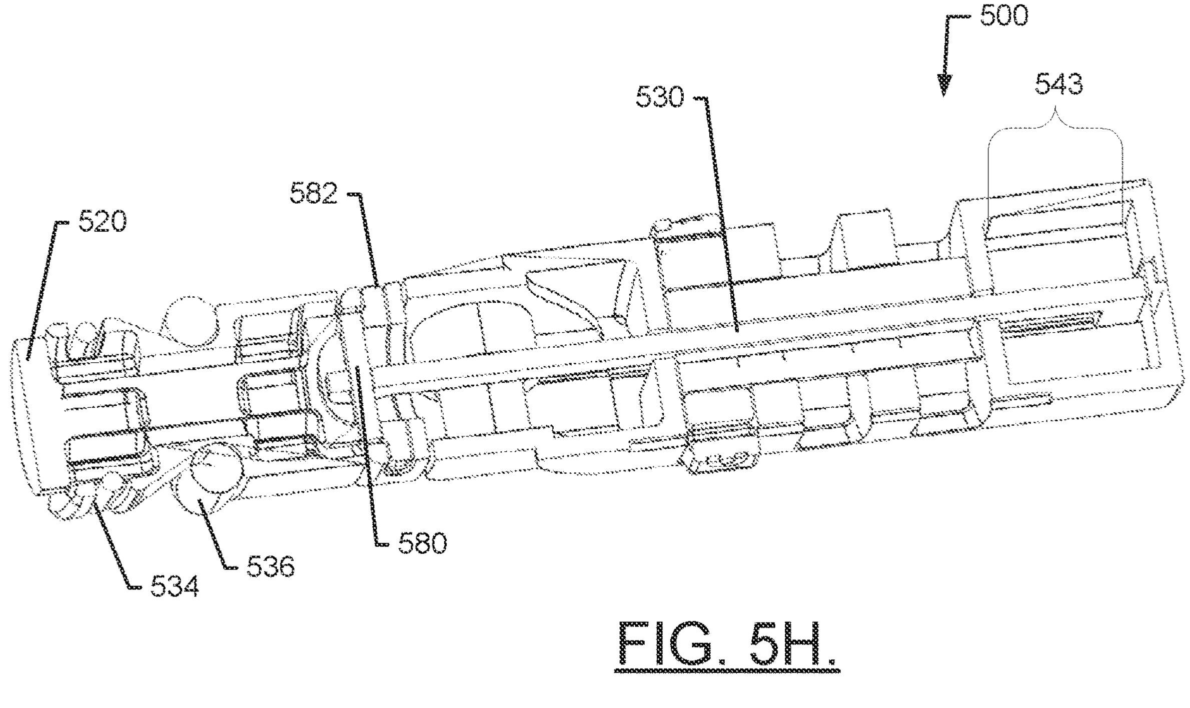
Figure 5I:
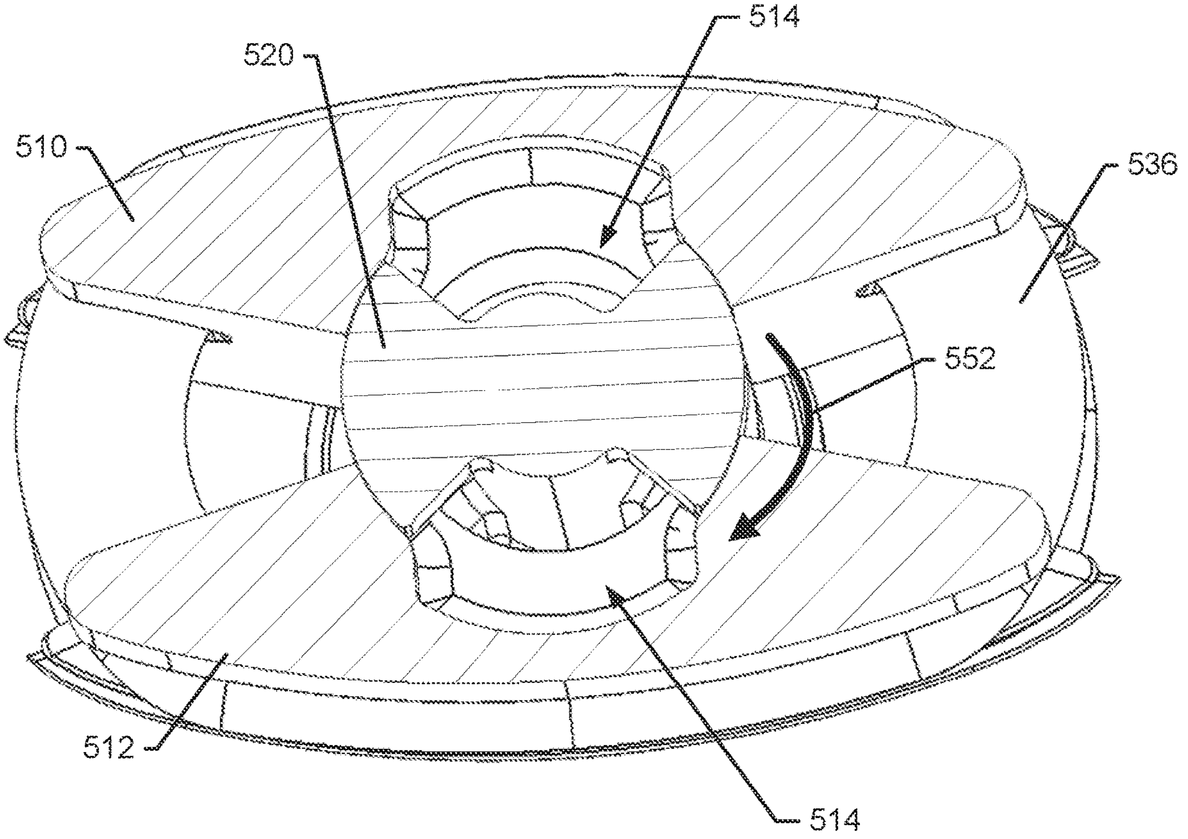
Figure 6C:
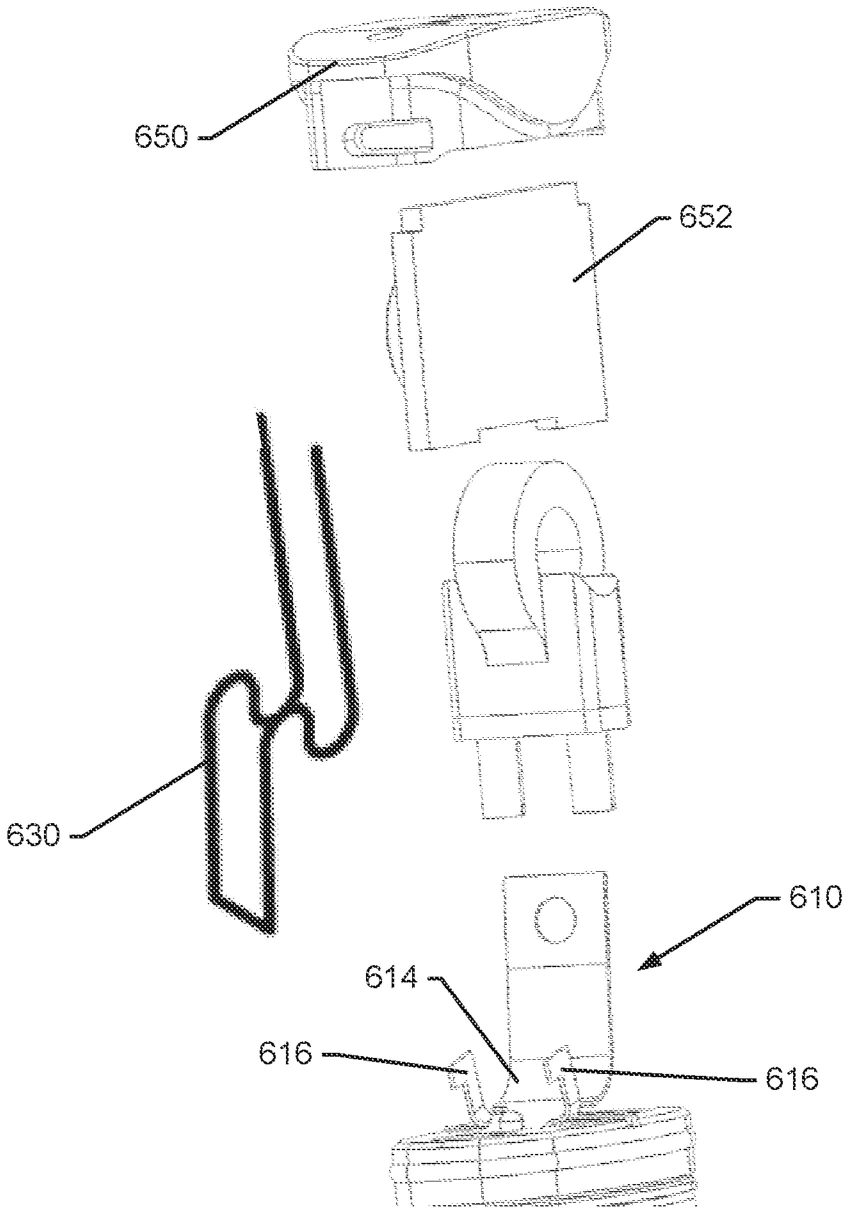
Figure 6F:
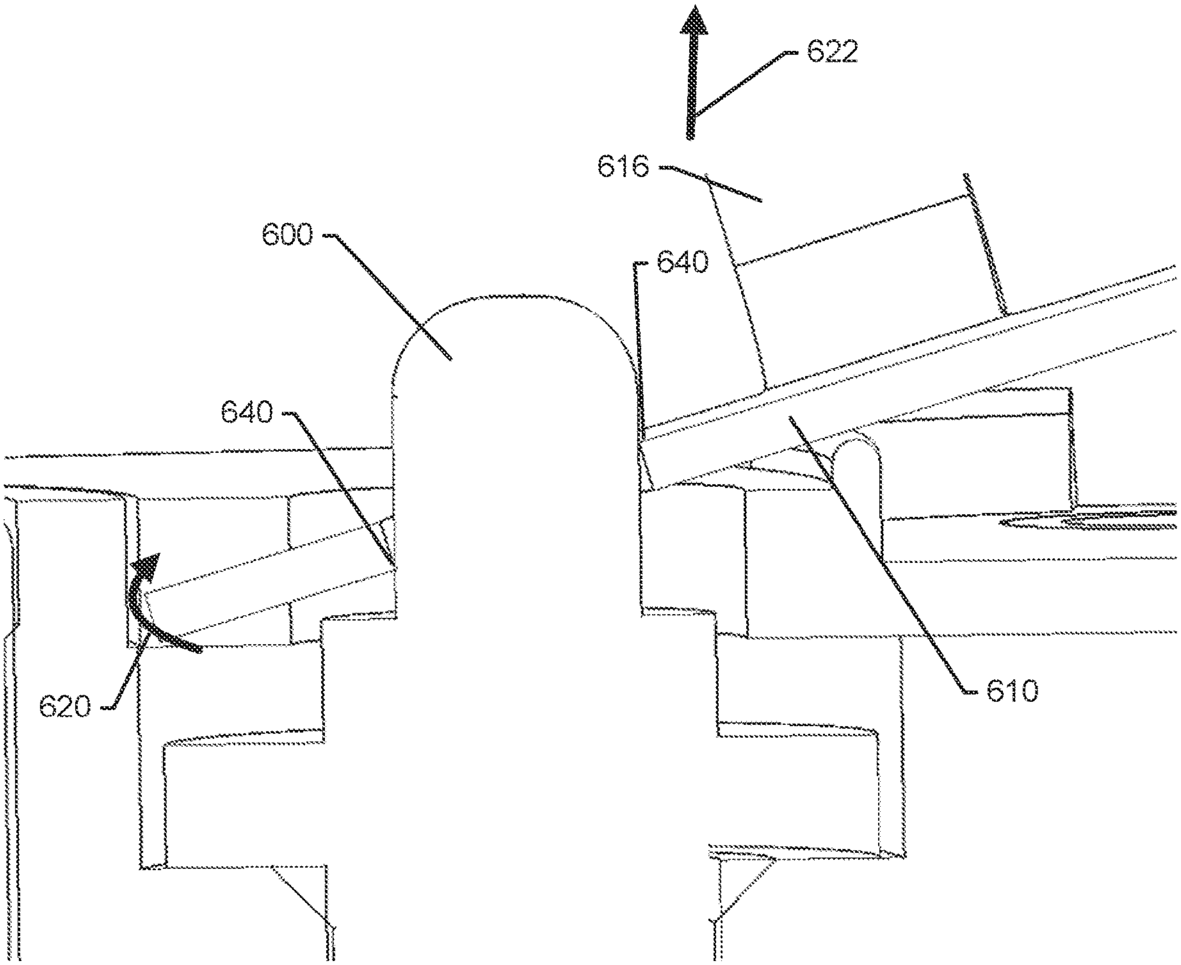
Figure 7C:
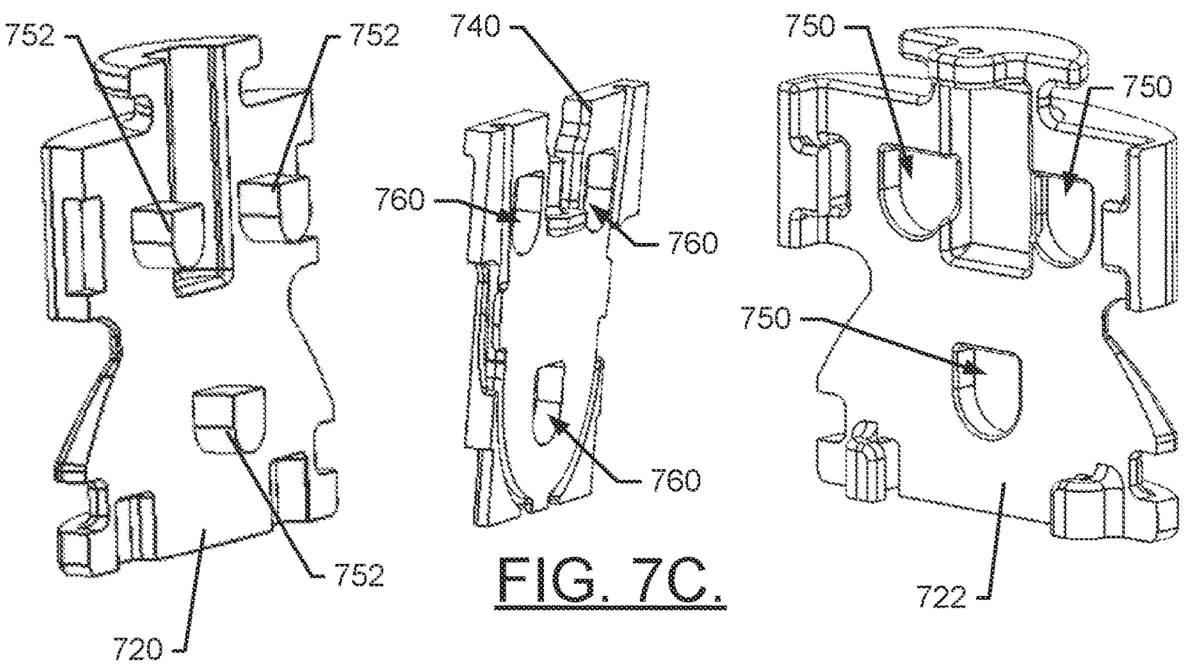
Figure 7D:
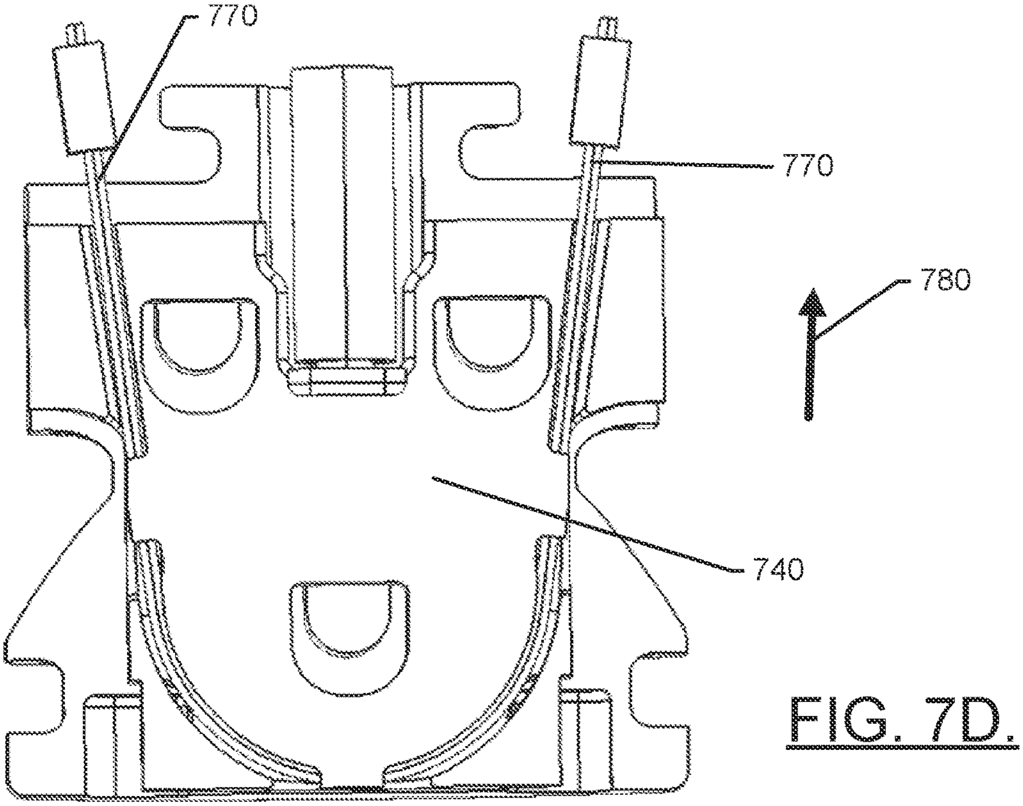
Figure 7E:
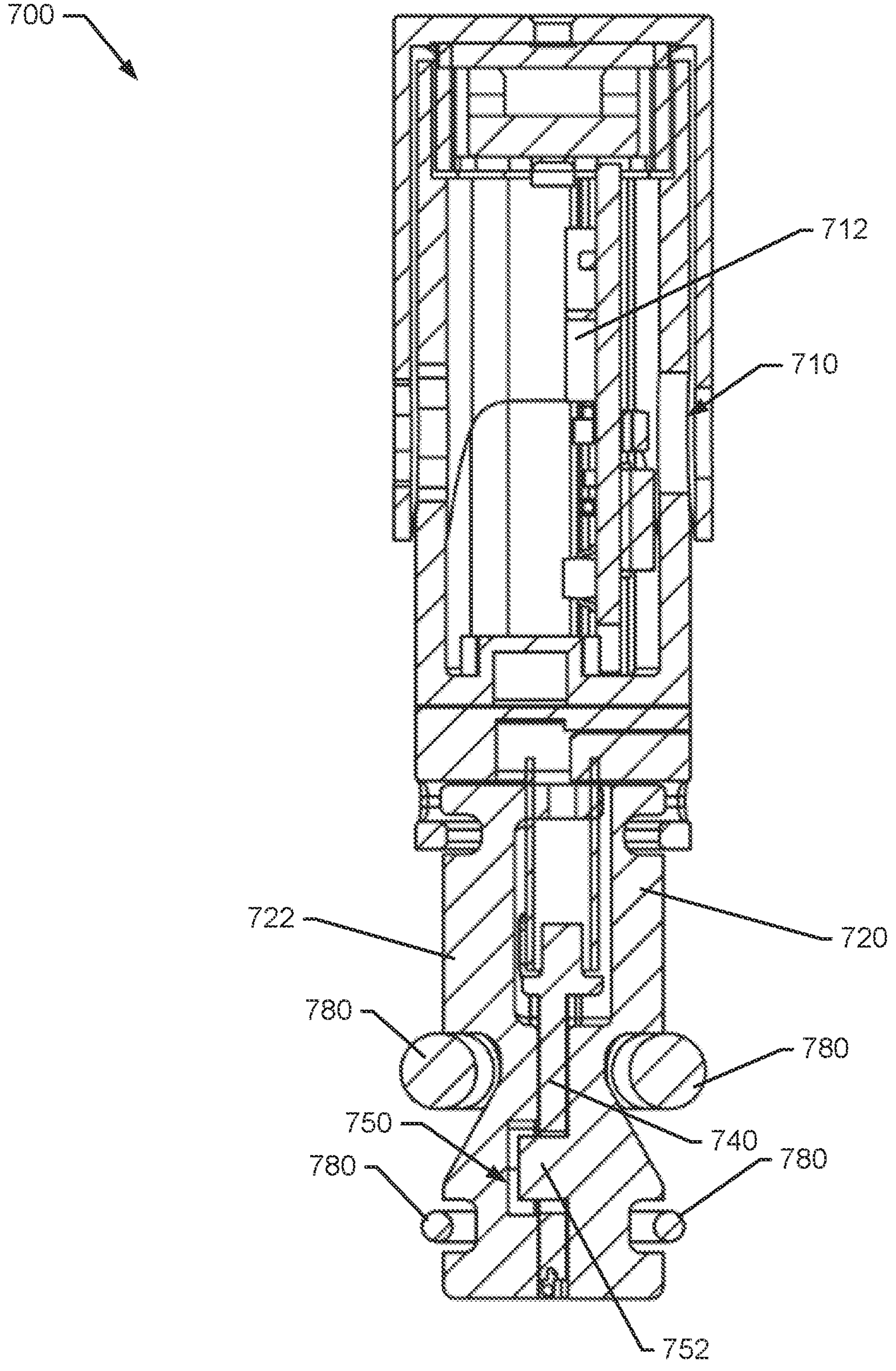
Figure 8:
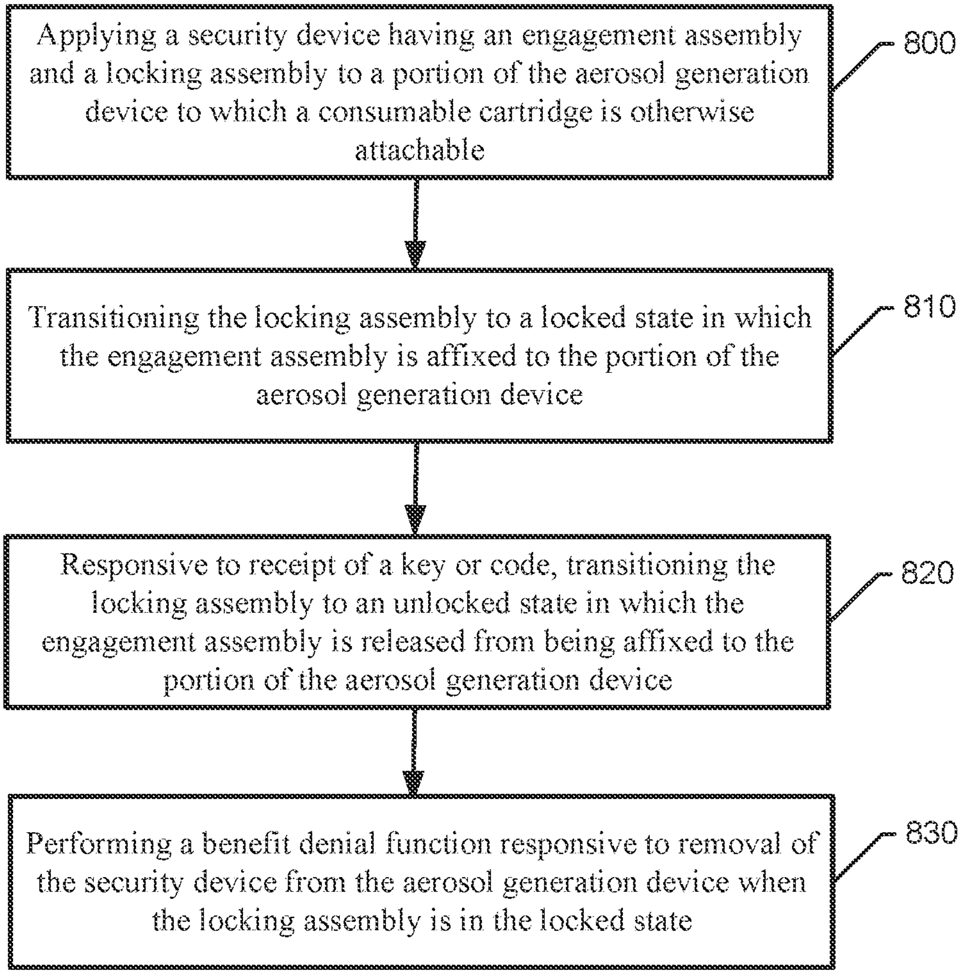

FIG. 4, which is defined by FIGS. 4A, 4B, 4C, 4D, and 4E, shows a security device in accordance with an example embodiment;

FIG. 5, which is defined by FIGS. 5A, 5B, 5C, 5D, 5E, 5F, 5G, 5H and 5I, shows another security device in accordance with an example embodiment;

FIG. 6, which is defined by FIGS. 6A, 6B, 6C, 6D, 6E and 6F, illustrates another security device in accordance with an example embodiment;

FIG. 7, which is defined by FIGS. 7A, 7B, 7C, 7D and 7E illustrates yet another security device in accordance with an example embodiment; and FIG. 8 is a block diagram of a method of preventing unauthorized use of an aerosol provision/generation device in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, non-combustible aerosol provision systems such as an ENDS device, may be targets of unauthorized use. In order to inhibit or prevent such unauthorized usage, security features may be employed. Some security features may require modifications to either hardware or software (or both) for existing devices. While certainly capable of being effective, however, it may be desirable to avoid changing existing device or component designs. Accordingly, some example embodiments may provide security devices that can be provided for use with aerosol provision devices without necessarily modifying the devices themselves. Such security devices may, for example, be benefit denial devices that prevent the aerosol provision device from being used, and may do so in some cases by destroying the aerosol provision device, unless the security device is properly removed. Proper removal may be done by authorized personnel who either have a code, unlock device and/or the like, which is configured to unlock the security device after the security device has been engaged with the aerosol provision device. Accordingly, some embodiments may provide solutions to the issues noted above and such solutions may be practiced either alone or in combination with each other.

Given that example embodiments may be employed in connection with providing security for non-combustible aerosol provision systems such as ENDS devices, a general description of an example device will be provided since some aspects of the case described herein may be tailored to interface with such devices.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are generally directed to delivery systems designed to deliver at least one substance to a user, such as to satisfy a particular "consumer moment." The substance may include constituents that impart a physiological effect on the user, a sensorial effect on the user, or both.

Delivery systems may take many forms. Examples of suitable delivery systems include aerosol provision systems such as powered aerosol provision systems designed to release one or more substances or compounds from an aerosol-generating material without combusting the aerosol-generating material. These aerosol provision systems may at times be referred to as non-combustible aerosol provision systems, aerosol delivery devices or the like, and the aerosol-generating material may be, for example, in the form of a solid, semi-solid, liquid or gel and may or may not contain nicotine.

Examples of suitable aerosol provision systems include vapor products, heat-not-burn products, hybrid products and the like. Vapor products are commonly known as "electronic cigarettes," "e-cigarettes" or electronic nicotine delivery systems (ENDS), although the aerosol-generating material need not include nicotine. Many vapor products are designed to heat a liquid material to generate an aerosol. Other vapor products are designed to break up an aerosol-generating material into an aerosol without heating, or with only secondary heating. Heat-not-burn products include tobacco heating products (THPs) and carbon-tipped tobacco heating products (CTHPs), and many are designed to heat a solid material to generate an aerosol without combusting the material.

Hybrid products use a combination of aerosol-generating materials, one or a plurality of which may be heated. Each of the aerosol-generating materials may be, for example, in the form of a solid, semi-solid, liquid, or gel. Some hybrid products are similar to vapor products except that the aerosol generated from a liquid or gel aerosol-generating material passes through a second material (such as tobacco) to pick up additional constituents before reaching the user. In some example implementations, the hybrid system includes a liquid or gel aerosol-generating material, and a solid aerosol-generating material. The solid aerosol-generating material may include, for example, tobacco or a non-tobacco product.

Figure 1A:
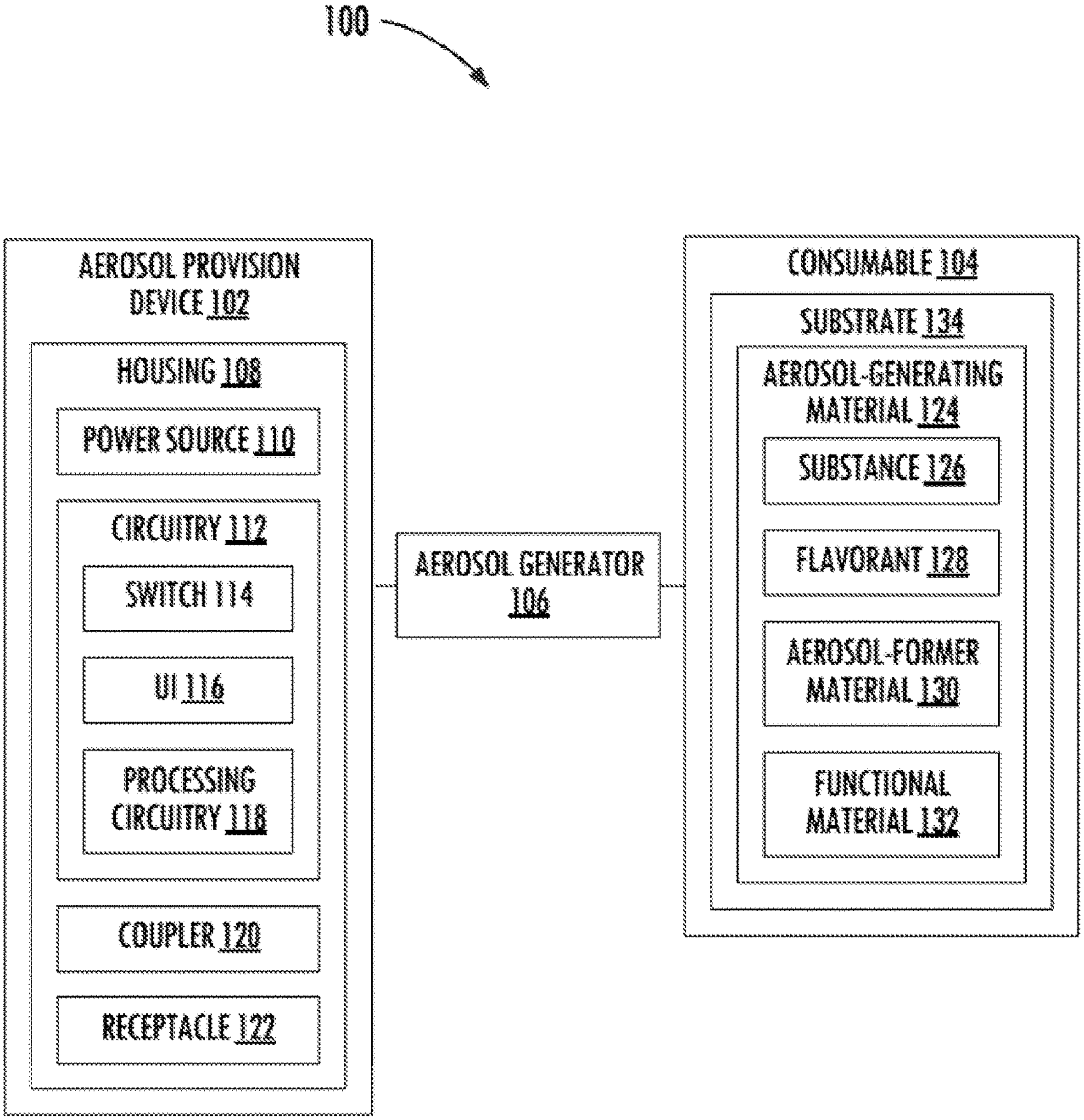
FIG. 1A illustrates a general block diagram of a non-combustible aerosol provision system that may be used in connection with an example embodiment.

FIG. 1A is a block diagram of an aerosol provision system 100 according to some example implementations. In various examples, the aerosol provision system may be a vapor product, heat-not-burn product or hybrid product. The aerosol provision system includes one or more of each of a number of components including, for example, an aerosol provision device 102, and a consumable 104 (sometimes referred to as an article) for use with the aerosol provision device. The aerosol provision system also includes an aerosol generator 106. In various implementations, the aerosol generator may be part of the aerosol provision device or the consumable. In other implementations, the aerosol generator may be separate from the aerosol provision device and the consumable, and removably engaged with the aerosol provision device and/or the consumable.

In various examples, the aerosol provision system 100 and its components including the aerosol provision device 102 and the consumable 104 may be reusable or single-use. In some examples, the aerosol provision system including both the aerosol provision device and the consumable may be single use. In some examples, the aerosol provision device may be reusable, and the consumable may be reusable (e.g., refillable) or single use (e.g., replaceable). In yet further examples, the consumable may be both refillable and also replaceable. In examples in which the aerosol generator 106 is part of the aerosol provision device or the consumable, the aerosol generator may be reusable or single-use in the same manner as the aerosol provision device or the consumable.

In some example implementations, the aerosol provision device 102 may include a housing 108 with a power source 110 and circuitry 112. The power source is configured to provide a source of power to the aerosol provision device and thereby the aerosol provision system 100. The power source may be or include, for example, an electric power source such as a non-rechargeable battery or a rechargeable battery, solid-state battery (SSB), lithium-ion battery, supercapacitor, or the like.

The circuitry 112 may be configured to enable one or more functionalities (at times referred to as services) of the aerosol provision device 102 and thereby the aerosol provision system 100. The circuitry includes electronic components, and in some examples one or more of the electronic components may be formed as a circuit board such as a printed circuit board (PCB).

In some examples, the circuitry 112 includes at least one switch 114 that may be directly or indirectly manipulated by a user to activate the aerosol provision device 102 and thereby the aerosol provision system 100. The switch may be or include a pushbutton, touch-sensitive surface or the like that may be operated manually by a user. Additionally or alternatively, the switch may be or include a sensor configured to sense one or more process variables that indicate use of the aerosol provision device or aerosol provision system. One example is a flow sensor, pressure sensor, pressure switch or the like that is configured to detect airflow or a change in pressure caused by airflow when a user draws on the consumable 104.

The switch 114 may provide user interface functionality. In some examples, the circuitry 112 may include a user interface (UI) 116 that is separate from or that is or includes the switch. The UI may include one or more input devices and/or output devices to enable interaction between the user and the aerosol provision device 102. As described above with respect to the switch, examples of suitable input devices include pushbuttons, touch-sensitive surfaces and the like. The one or more output devices generally include devices configured to provide information in a human-perceptible form that may be visual, audible or tactile/haptic. Examples of suitable output devices include light sources such as light-emitting diodes (LEDs), quantum dot-based LEDs and the like. Other examples of suitable output devices include display devices (e.g., electronic visual displays), touchscreens (integrated touch-sensitive surface and display device), loudspeakers, vibration motors and the like.

In some examples, the circuitry 112 includes processing circuitry 118 configured to perform data processing, application execution, or other processing, control or management services according to one or more example implementations. The processing circuitry may include a processor embodied in a variety of forms such as at least one processor core, microprocessor, coprocessor, controller, microcontroller or various other computing or processing devices including one or more integrated circuits such as, for example, an ASIC (application specific integrated circuit), an FPGA (field programmable gate array), some combination thereof, or the like. In some examples, the processing circuitry may include memory coupled to or integrated with the processor, and which may store data, computer program instructions executable by the processor, some combination thereof, or the like.

As also shown, in some examples, the housing 108 and thereby the aerosol provision device 102 may also include a coupler 120 and/or a receptacle 122 structured to engage and hold the consumable 104, and thereby couple the aerosol provision device with the consumable. The coupler may be or include a connector, fastener or the like that is configured to connect with a corresponding coupler of the consumable, such as by a press fit (or interference fit) connection, threaded connection, magnetic connection or the like. The receptacle may be or include a reservoir, tank, container, cavity, receiving chamber or the like that is structured to receive and contain the consumable or at least a portion of the consumable.

The consumable 104 is an article including aerosol-generating material 124 (also referred to as an aerosol precursor composition), part or all of which is intended to be consumed during use by a user. The aerosol provision system 100 may include one or more consumables, and each consumable may include one or more aerosol-generating materials. In some examples in which the aerosol provision system is a hybrid product, the aerosol provision system may include a liquid or gel aerosol-generating material to generate an aerosol, which may then pass through a second, solid aerosol-generating material to pick up additional constituents before reaching the user. These aerosol-generating materials may be within a single consumable or respective consumables that may be separately removable.

The aerosol-generating material 124 is capable of generating aerosol, for example when heated, irradiated or energized in any other way. The aerosol-generating material may be, for example, in the form of a solid, semi-solid, liquid or gel. The aerosol-generating material may include an "amorphous solid," which may be alternatively referred to as a "monolithic solid" (i.e., non-fibrous). In some examples, the amorphous solid may be a dried gel. The amorphous solid is a solid material that may retain some fluid, such as liquid, within it. In some examples, the aerosol-generating material may include from about 50 wt %, 60 wt % or 70 wt % of amorphous solid, to about 90 wt %, 95 wt % or 100 wt % of amorphous solid.

The aerosol-generating material 124 may include one or more of each of a number of constituents such as an active substance 126, flavorant 128, aerosol-former material 130 or other functional material 132.

The active substance 126 may be a physiologically active material, which is a material intended to achieve or enhance a physiological response such as improved alertness, improved focus, increased energy, increased stamina, increased calm or improved sleep. The active substance may for example be selected from nutraceuticals, nootropics, psychoactives. The active substance may be naturally occurring or synthetically obtained. The active substance may include, for example, nicotine, caffeine, GABA (γ-aminobutyric acid), L-theanine, taurine, theine, vitamins such as B6 or B12 (cobalamin) or C, melatonin, cannabinoids, terpenes, or constituents, derivatives, or combinations thereof. The active substance may include one or more constituents, derivatives or extracts of tobacco, *cannabis* or another botanical.

In some examples in which the active substance 126 includes derivatives or extracts, the active substance may be or include one or more cannabinoids or terpenes.

As noted herein, the active substance 126 may include or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may include an active compound naturally existing in a botanical, obtained synthetically. The material may be in the form of liquid, gas, solid, powder, dust, crushed particles, granules, pellets, shreds, strips, sheets, or the like. Example botanicals are tobacco, *eucalyptus*, star *anise*, hemp, cocoa, *cannabis*, fennel, lemongrass, peppermint, spearmint, rooibos, chamomile, flax, ginger, *Ginkgo biloba*, hazel, hibiscus, laurel, licorice (liquorice), matcha, *mate*, orange skin, *papaya*, rose, sage, tea such as green tea or black tea, thyme, clove, cinnamon, coffee, aniseed (*anise*), basil, bay leaves, cardamom, coriander, cumin, nutmeg, oregano, paprika, rosemary, saffron, lavender, lemon peel, mint, juniper, elderflower, vanilla, wintergreen, beefsteak plant, *curcuma*, turmeric, sandalwood, cilantro, bergamot, orange blossom, myrtle, cassis, valerian, pimento, mace, damien, marjoram, olive, lemon balm, lemon basil, chive, *carvi, verbena*, tarragon, geranium, mulberry, *ginseng*, theanine, theacrine, maca, ashwagandha, damiana, guarana, chlorophyll, baobab or any combination thereof. The mint may be chosen from the following mint varieties: *Mentha* Arventis, *Mentha* c.v., *Mentha niliaca, Mentha piperita, Mentha piperita citrata* c.v., *Mentha piperita* c.v, *Mentha spicata crispa, Mentha* cardifolia, *Mentha longifolia, Mentha suaveolens variegata, Mentha pulegium, Mentha spicata* c.v. and *Mentha suaveolens.*

In yet other examples, the active substance 126 may be or include one or more of 5-hydroxytryptophan (5-HTP)/oxitriptan/*Griffonia simplicifolia*, acetylcholine, arachidonic acid (AA, omega-6), ashwagandha (*Withania somnifera*), *Bacopa monniera, beta* alanine, *beta*-hydroxy-*beta*-methylbutyrate (HMB), *Centella asiatica*, chai-hu, cinnamon, citicoline, cotinine, creatine, curcumin, docosahexaenoic acid (DHA, omega-3), dopamine, *Dorstenia arifolia, Dorstenia Odorata*, essential oils, GABA, *Galphimia glauca*, glutamic acid, hops, *kaempferia parviflora* (*Thai ginseng*), kava, L-carnitine, L-arginine, lavender oil, L-choline, liquorice, L-lysine, L-theanine, L-tryptophan, lutein, magnesium, magnesium L-threonate, myo-inositol, *nardostachys chinensis*, nitrate, oil-based extract of *Viola odorata*, oxygen, phenylalanine, phosphatidylserine, quercetin, resveratrol, *Rhizoma gastrodiae, Rhodiola, Rhodiola rosea*, rose essential oil, S-adenosylmethionine (SAMe), sceletium *tortuosum, schisandra, selenium*, serotonin, skullcap, spearmint extract, spikenard, theobromine, tumaric, *Turnera aphrodisiaca*, tyrosine, vitamin A, vitamin B3, or *yerba mate.*

In some example implementations, the aerosol-generating material 124 includes a flavorant 128. As used herein, the terms "flavorant" and "flavor" refer to materials which, where local regulations permit, may be used to create a desired taste, aroma or other somatosensorial sensation in a product for adult consumers. Flavorants may include naturally occurring flavor materials, botanicals, extracts of botanicals, synthetically obtained materials, or combinations thereof (e.g., tobacco, *cannabis*, licorice (liquorice), *hydrangea*, eugenol, Japanese white bark *magnolia* leaf, chamomile, fenugreek, clove, maple, matcha, menthol, Japanese mint, aniseed (*anise*), cinnamon, turmeric, Indian spices, Asian spices, herb, wintergreen, cherry, berry, redberry, cranberry, peach, apple, orange, mango, clementine, lemon, lime, tropical fruit, *papaya*, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, *khat*, naswar, *betel*, shisha, pine, honey essence, rose oil, vanilla, lemon oil, orange oil, orange blossom, cherry blossom, *cassia*, caraway, cognac, jasmine, ylang-ylang, sage, fennel, wasabi, piment, ginger, coriander, coffee, hemp, a mint oil from any species of the genus *Mentha, eucalyptus*, star *anise*, cocoa, lemongrass, rooibos, flax, *Ginkgo biloba*, hazel, hibiscus, laurel, *mate*, orange skin, rose, tea such as green tea or black tea, thyme, juniper, elderflower, basil, bay leaves, cumin, oregano, paprika, rosemary, saffron, lemon peel, mint, beefsteak plant, *curcuma*, cilantro, myrtle, cassis, valerian, pimento, mace, damien, marjoram, olive, lemon balm, lemon basil, chive, *carvi, verbena*, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. Flavorants may be imitation, synthetic or natural ingredients or blends thereof. Flavorants may be in any suitable form, for example, liquid such as an oil, solid such as a powder, or gas.

In some example implementations, the flavorant 128 may include a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

The aerosol-former material 130 may include one or more constituents capable of forming an aerosol. In some example implementations, the aerosol-former material may include one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional materials 132 may include one or more of pH regulators, colouring agents, preservatives, binders, fillers, stabilizers, and/or antioxidants. Suitable binders include, for example, pectin, guar gum, fruit pectin, citrus pectin, tobacco pectin, hydroxyethyl guar gum, hydroxypropyl guar gum, hydroxyethyl locust bean gum, hydroxypropyl locust bean gum, alginate, starch, modified starch, derivatized starch, methyl cellulose, ethyl cellulose, ethylhydroxymethyl cellulose, carboxymethyl cellulose, tamarind gum, dextran, pullalon, konjac flour or xanthan gum.

In some example implementations, the aerosol-generating material 124 may be present on or in a support to form a substrate 134. The support may be or include, for example, paper, card, paperboard, cardboard, reconstituted material (e.g., a material formed from reconstituted plant material, such as reconstituted tobacco, reconstituted hemp, etc.), a plastics material, a ceramic material, a composite material, glass, a metal, or a metal alloy. In some examples, the support includes a susceptor, which may be embedded within the aerosol-generating material, or on one or either side of the aerosol-generating material.

Although not separately shown, in some example implementations, the consumable 104 may further include receptacle structured to engage and hold the aerosol-generating material 124, or substrate 134 with the aerosol-generating material. The receptacle may be or include a reservoir, tank, container, cavity, receiving chamber or the like that is structured to receive and contain the aerosol-generating material or the substrate. The consumable may include an aerosol-generating material transfer component (also referred to as a liquid transport element) configured to transport aerosol-generating material to the aerosol generator 106. The aerosol-generating material transfer component may be adapted to wick or otherwise transport aerosol-generating material via capillary action. In some examples, the aerosol-generating material transfer component may include a microfluidic chip, a micro pump or other suitable component to transport aerosol-generating material.

The aerosol generator 106 (also referred to as an atomizer, aerosolizer or aerosol production component) is configured to energize the aerosol-generating material 124 to generate an aerosol, or otherwise cause generation of an aerosol from the aerosol-generating material. More particularly, in some examples, the aerosol generator may be powered by the power source 110 under control of the circuitry 112 to energize the aerosol-generating material to generate an aerosol.

In some example implementations, the aerosol generator 106 is an electric heater configured to perform electric heating in which electrical energy from the power source is converted to heat energy, which the aerosol-generating material is subject to so as to release one or more volatiles from the aerosol-generating material to form an aerosol. Examples of suitable forms of electric heating include resistance (Joule) heating, induction heating, dielectric and microwave heating, radiant heating, arc heating and the like. More particular examples of suitable electric heaters include resistive heating elements such as wire coils, flat plates, prongs, micro heaters or the like.

In some example implementations, the aerosol generator 106 is configured to cause an aerosol to be generated from the aerosol-generating material without heating, or with only secondary heating. For example, the aerosol generator may be configured to subject the aerosol-generating material to one or more of increased pressure, vibration, or electrostatic energy. More particular examples of these aerosol generators include jet nebulizers, ultrasonic wave nebulizers, vibrating mesh technology (VMT) nebulizers, surface acoustic wave (SAW) nebulizers, and the like.

A jet nebulizer is configured to use compressed gas (e.g., air, oxygen) to break up aerosol-generating material 124 into an aerosol, and an ultrasonic wave nebulizer is configured to use ultrasonic waves to break up aerosol-generating material into an aerosol. A VMT nebulizer includes a mesh, and a piezo material (e.g., piezoelectric material, piezomagnetic material) that may be driven to vibrate and cause the mesh to break up aerosol-generating material into an aerosol. A SAW nebulizer is configured to use surface acoustic waves or Rayleigh waves to break up aerosol-generating material into an aerosol.

In some examples, the aerosol generator 106 may include a susceptor, or the susceptor may be part of the substrate 134. The susceptor is a material that is heatable by penetration with a varying magnetic field generated by a magnetic field generator that may be separate from or part of the aerosol generator. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor in some examples may be both electrically-conductive and magnetic, so that the susceptor of these examples is heatable by both heating mechanisms.

Although not separately shown, either or both the aerosol provision device 102 or the consumable 104 may include an aerosol-modifying agent. The aerosol-modifying agent is a substance configured to modify the aerosol generated from the aerosol-generating material 124, such as by changing the taste, flavor, acidity or another characteristic of the aerosol. In various examples, the aerosol-modifying agent may be an additive or a sorbent. The aerosol-modifying agent may include, for example, one or more of a flavorant, colorant, water or carbon adsorbent. The aerosol-modifying agent may be a solid, semi-solid, liquid or gel. The aerosol-modifying agent may be in powder, thread or granule form. The aerosol-modifying agent may be free from filtration material. In some examples, the aerosol-modifying agent may be provided in an aerosol-modifying agent release component, that is operable to selectively release the aerosol-modifying agent.

The aerosol provision system 100 and its components including the aerosol provision device 102, consumable 104, and aerosol generator 106 may be manufactured with any of a number of different form factors, and with additional or alternative components relative to those described above.

FIGS. 1B and 1C illustrate an aerosol provision system 140 in the form of a vapor product, and that in some example implementations may correspond to the aerosol provision system 100. As shown, the aerosol provision system 140 may include an aerosol provision device 141 (also referred to as a control body or power unit) and a consumable 142 (also referred to as a cartridge or tank), which may correspond to respectively the aerosol provision device 102 and the consumable 104. The aerosol provision system and in particular the consumable may also include an aerosol generator corresponding to the aerosol generator 106, and in the form of an electric heater 144 such as a heating element like a metal plate or metal wire coil configured to convert electrical energy to heat energy through resistance (Joule)

heating. The aerosol provision device and the consumable can be permanently or detachably aligned in a functioning relationship. FIGS. 1B and 1C illustrate respectively a perspective view and a partially cut-away side view of the aerosol provision system in a coupled configuration.

As seen in FIG. 1B and the cut-away view illustrated in FIG. 1C, the aerosol provision device 141 and consumable 142 each include a number of respective components. The components illustrated in FIG. 1C are representative of the components that may be present in an aerosol provision device and consumable and are not intended to limit the scope of components that are encompassed by the present disclosure.

The aerosol provision device 141 may include a housing 145 (sometimes referred to as an aerosol provision device shell) that may include a power source 150. The housing may also include circuitry 152 with a switch in the form of a sensor 154, a user interface including a light source 156 that may be illuminated with use of the aerosol provision system 140, and processing circuitry 158 (also referred to as a control component). The housing may also include a receptacle in the form of a consumable receiving chamber 162 structured to engage and hold the consumable 142. And the consumable may include an aerosol-generating material 164 that may correspond to aerosol-generating material 124, and that may include one or more of each of a number of constituents such as an active substance, flavorant, aerosol-former material or other functional material.

As also seen in FIG. 1C, the aerosol provision device 141 may also include electrical connectors 166 positioned in the consumable receiving chamber 162 configured to electrically couple the circuitry and thereby the aerosol provision device with the consumable 142, and in particular electrical contacts 168 on the consumable. In this regard, the electrical connectors and electrical contacts may form a connection interface of the aerosol provision device and consumable. As also shown, the aerosol provision device may include an external electrical connector 170 to connect the aerosol provision device with one or more external devices. Examples of suitable external electrical connectors include Universal Serial Bus (USB) connectors, proprietary connectors such as Apple's Lightning connector, and the like.

In various examples, the consumable 142 includes a tank portion and a mouthpiece portion. The tank portion and the mouthpiece portion may be integrated or permanently fixed together, or the tank portion may itself define the mouthpiece portion (or vice versa). In other examples, the tank portion and the mouthpiece portion may be separate and removably engaged with one another.

The consumable 142, tank portion and/or mouthpiece portion may be separately defined in relation to a longitudinal axis (L), a first transverse axis (T1) that is perpendicular to the longitudinal axis, and a second transverse axis (T2) that is perpendicular to the longitudinal axis and is perpendicular to the first transverse axis. The consumable can be formed of a housing 172 (sometimes referred to as the consumable shell) enclosing a reservoir 174 (in the tank portion) configured to retain the aerosol-generating material 164. In some examples, the consumable may include an aerosol generator, such as electric heater 144 in the illustrated example. In some examples, the electrical connectors 166 on the aerosol provision device 141 and electrical contacts 168 on the consumable may electrically connect the electric heater with the power source 150 and/or circuitry 152 of the aerosol provision device.

As shown, in some examples, the reservoir 174 may be in fluid communication with an aerosol-generating material transfer component 176 adapted to wick or otherwise transport aerosol-generating material 164 stored in the reservoir to the electric heater 144. At least a portion of the aerosol-generating material transfer component may be positioned proximate (e.g., directly adjacent, adjacent, in close proximity to, or in relatively close proximity to) the electric heater. The aerosol-generating material transfer component may extend between the electric heater and the aerosol-generating material stored in the reservoir, and at least a portion of the electric heater may be located above a proximal end the reservoir. For the purposes of the present disclosure, it should be understood that the term "above" in this particular context should be interpreted as meaning toward a proximal end of the reservoir and/or the consumable 142 in direction substantially along the longitudinal axis (L). Other arrangements of the aerosol-generating material transfer component are also contemplated within the scope of the disclosure. For example, in some example implementations, the aerosol-generating material transfer component may be positioned proximate a distal end of the reservoir and/or arranged transverse to the longitudinal axis (L).

The electric heater 144 and aerosol-generating material transfer component 176 may be configured as separate elements that are fluidly connected, the electric heater and aerosol-generating material transfer component or may be configured as a combined element. For example, in some implementations an electric heater may be integrated into an aerosol-generating material transfer component. Moreover, the electric heater and the aerosol-generating material transfer component may be formed of any construction as otherwise described herein. In some examples, a valve may be positioned between the reservoir 174 and electric heater, and configured to control an amount of aerosol-generating material 164 passed or delivered from the reservoir to the electric heater.

An opening 178 may be present in the housing 172 (e.g., at the mouth end of the mouthpiece portion) to allow for egress of formed aerosol from the consumable 142.

As indicated above, the circuitry 152 of the aerosol provision device 141 may include a number of electronic components, and in some examples may be formed of a circuit board such as a printed circuit board (PCB) that supports and electrically connects the electronic components. The sensor 154 (switch) may be one of these electronic components positioned on the circuit board. In some examples, the sensor may comprise its own circuit board or other base element to which it can be attached. In some examples, a flexible circuit board may be utilized. A flexible circuit board may be configured into a variety of shapes. In some examples, a flexible circuit board may be combined with, layered onto, or form part or all of a heater substrate.

In some examples, the reservoir 174 may be a container for storing the aerosol-generating material 164. In some examples, the reservoir may be or include a fibrous reservoir with a substrate with the aerosol-generating material present on or in a support. For example, the reservoir can comprise one or more layers of nonwoven fibers substantially formed into the shape of a tube encircling the interior of the housing 172, in this example. The aerosol-generating material may be retained in the reservoir. Liquid components, for example, may be absorptively retained by the reservoir. The reservoir may be in fluid connection with the aerosol-generating material transfer component 176. The aerosol-generating material transfer component may transport the aerosol-generating material stored in the reservoir via capillary action—or via a micro pump—to the electric heater 144. As such, the electric heater is in a heating arrangement with the aerosol-generating material transfer component.

In use, when a user draws on the aerosol provision system 140, airflow is detected by the sensor 154, and the electric heater 144 is activated to energize the aerosol-generating material 164 to generate an aerosol. Drawing upon the mouth end of the aerosol provision system causes ambient air to enter and pass through the aerosol provision system. In the consumable 142, the drawn air combines with the aerosol that is whisked, aspirated or otherwise drawn away from the electric heater and out the opening 178 in the mouth end of the aerosol provision system.

Figure 1D:
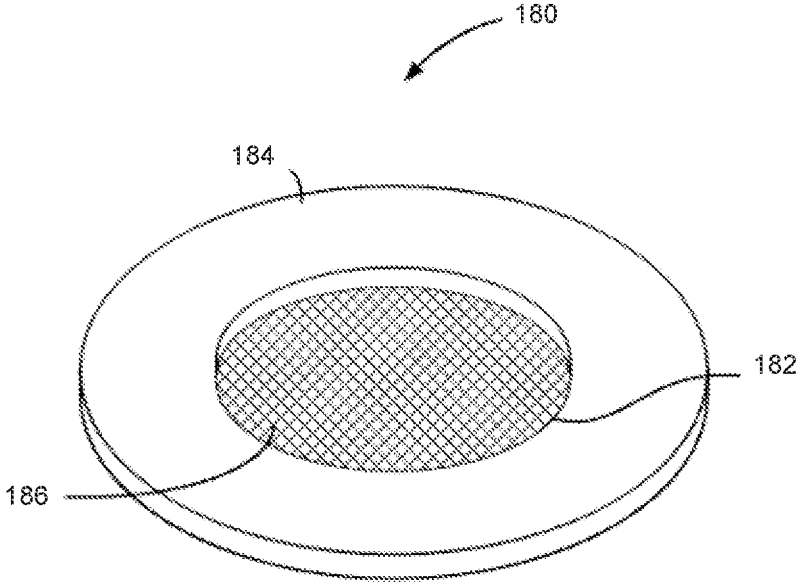
FIG. 1D illustrates a nebulizer that may be used to implement an aerosol generator of an aerosol provision system, according to some example implementations.

Again, as shown in FIGS. 1B and 1C, the aerosol generator of the aerosol provision system 140 is an electric heater 144 designed to heat the aerosol-generating material 164 to generate an aerosol. In other implementations, the aerosol generator is designed to break up the aerosol-generating material without heating, or with only secondary heating. FIG. 1D illustrates a nebulizer 180 that may be used to implement the aerosol generator of an aerosol provision system, according to some these other example implementations.

As shown in FIG. 1D, the nebulizer 180 includes a mesh plate 182 and a piezo material 184 that may be affixed to one another. The piezo material may be driven to vibrate and cause the mesh plate to break up aerosol-generating material into an aerosol. In some examples, the nebulizer may also include a supporting component located on a side of the mesh plate opposite the piezo material to increase the longevity of the mesh plate, and/or an auxiliary component between the mesh plate and the piezo material to facilitate interfacial contact between the mesh plate and the piezo material.

In various example implementations, the mesh plate 182 may have a variety of different configurations. The mesh plate may have a flat profile, a domed shape (concave or convex with respect to the aerosol-generating material), or a flat portion and a domed portion. The mesh plate defines a plurality of perforations 186 that may be substantially uniform or vary in size across a perforated portion of the mesh plate. The perforations may be circular openings or non-circular openings (e.g., oval, rectangular, triangular, regular polygon, irregular polygon). In three-dimensions, the perforations may have a fixed cross section such as in the case of cylindrical perforations with a fixed circular cross section, or a variable cross section such as in the case of truncated cone perforations with a variable circular cross section. In other implementations, the perforations may be tetragonal or pyramidal.

The piezo material 184 may be or include a piezoelectric material or a piezomagnetic material. A piezoelectric material may be coupled to circuitry configured to produce an oscillating electric signal to drive the piezoelectric material to vibrate. For a piezomagnetic material, the circuitry may produce a pair of antiphase, oscillating electric signals to drive a pair of magnets to produce antiphase, oscillating magnetic fields that drives the piezomagnetic material to vibrate.

The piezo material 184 may be affixed to the mesh plate 182, and vibration of the piezo material may in turn cause the mesh plate to vibrate. The mesh plate may be in contact with or immersed in aerosol-generating material, in sufficient proximity of aerosol-generating material, or may otherwise receive aerosol-generating material via an aerosol-generating material transfer component. The vibration of the mesh plate, then, may cause the aerosol-generating material to pass through the perforations 186 that break up the aerosol-generating material into an aerosol. More particularly, in some examples, aerosol-generating material may be driven through the perforations 186 in the vibrating mesh plate 182 resulting in aerosol particles. In other examples in which the mesh plate is in contact with or immersed in aerosol-generating material, the vibrating mesh plate may create ultrasonic waves within aerosol-generating material that cause formation of an aerosol at the surface of the aerosol-generating material.

As described above, hybrid products use a combination of aerosol-generating materials, and some hybrid products are similar to vapor products except that the aerosol generated from one aerosol-generating material may pass through a second aerosol-generating material to pick up additional constituents. Another similar aerosol provision system in the form of a hybrid product may therefore be constructed similar to the vapor product in FIGS. 1B and 1C (with an electric heater 144 or a nebulizer 180). The hybrid product may include a second aerosol-generating material through which aerosol from the aerosol-generating material 164 is passed to pick up additional constituents before passing through the opening 178 in the mouth end of the aerosol provision system.

Figure 2A:
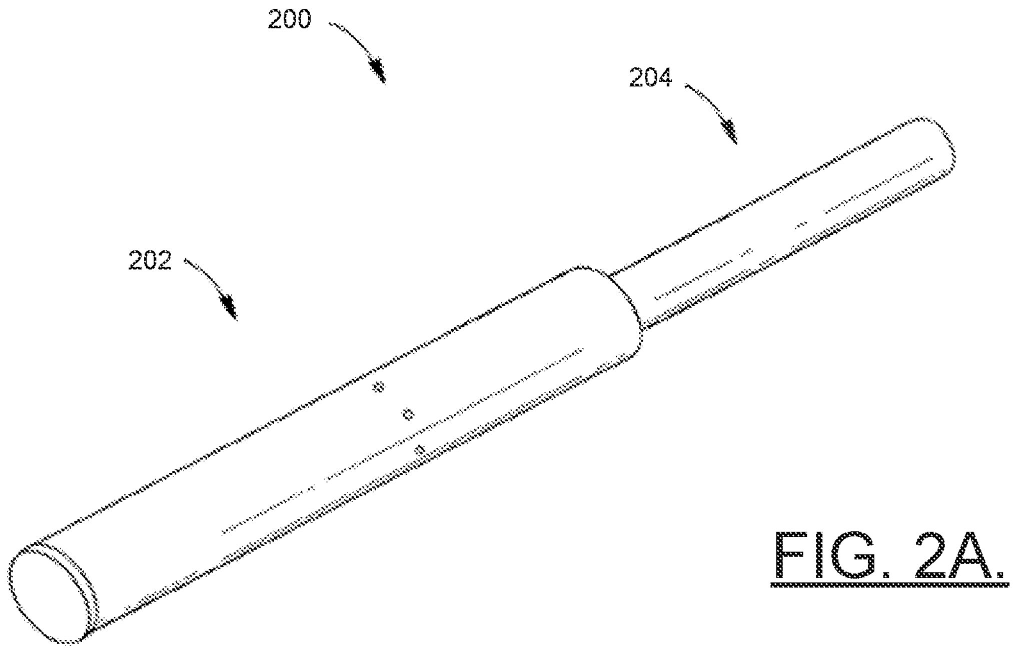
FIGS. 2A, 2B and 2C illustrate an aerosol provision system in the form of a heat-not-burn product, according to some example implementations.
Figure 2B:
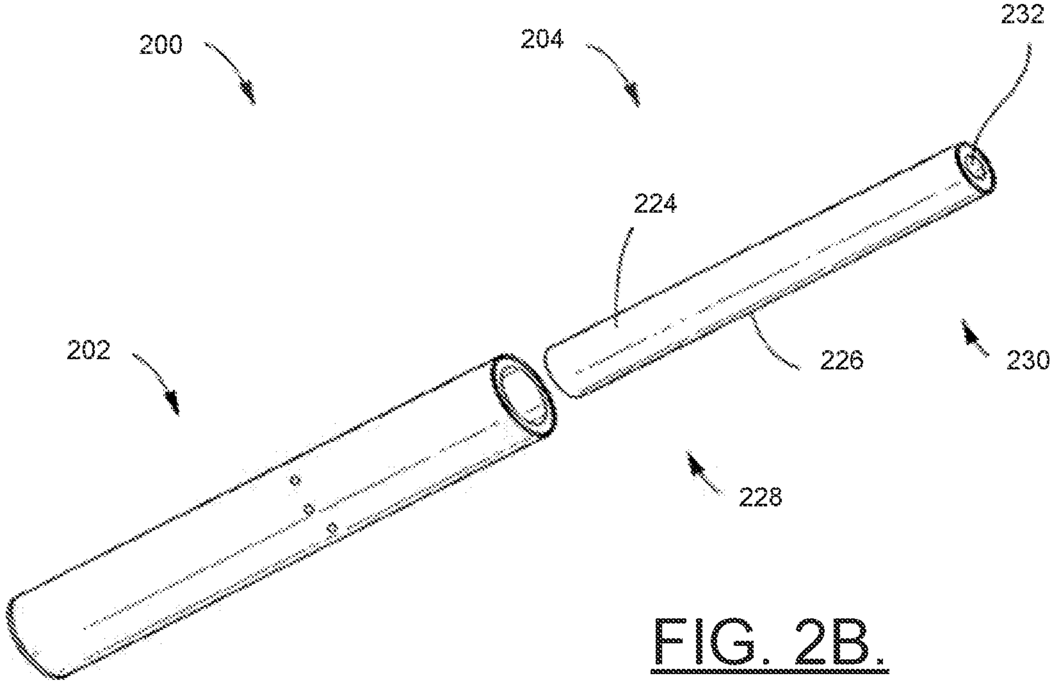
Figure 2C:
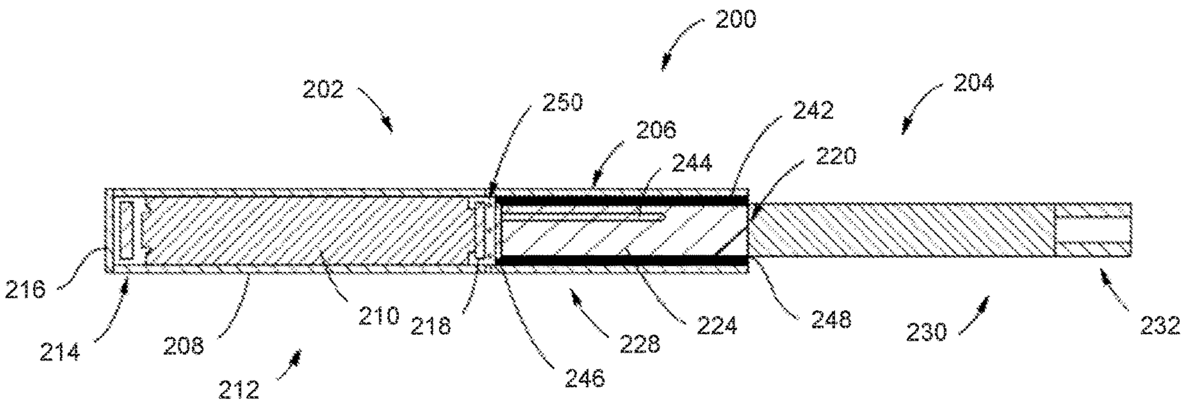

FIGS. 2A, 2B and 2C illustrate an aerosol provision system 200 in the form of a heat-not-burn product, and that in some example implementations may correspond to the aerosol provision system 100. As shown, the aerosol provision system may include an aerosol provision device 202 (also referred to as a control body or power unit) and a consumable 204 (also referred to as an aerosol source member or cartridge), which may correspond to respectively the aerosol provision device 102 and the consumable 104. The aerosol provision system and in particular the aerosol provision device may also include an aerosol generator corresponding to the aerosol generator 106, and in the form of an electric heater 206. The aerosol provision device and the consumable can be permanently or detachably aligned in a functioning relationship. FIG. 2A illustrates the aerosol provision system in a coupled configuration, whereas FIG. 2B illustrates the aerosol provision system in a decoupled configuration. FIG. 2C illustrates a partially cut-away side view of the aerosol provision system in the coupled configuration.

As seen in FIGS. 2A, 2B and 2C, the aerosol provision device 202 and consumable 204 each include a number of respective components. The components illustrated in the figures are representative of the components that may be present in an aerosol provision device and consumable and are not intended to limit the scope of components that are encompassed by the present disclosure.

The aerosol provision device 202 may include a housing 208 (sometimes referred to as an aerosol provision device shell) that may include a power source 210. The housing may also include circuitry 212 with a switch in the form of a sensor 214, a user interface including a light source 216 that may be illuminated with use of the aerosol provision system 200, and processing circuitry 218 (also referred to as a control component). In some examples, at least some of the electronic components of the circuitry may be formed of a circuit board or a flexible circuit board that supports and electrically connects the electronic components.

The housing 208 may also include a receptacle in the form of a consumable receiving chamber 220 structured to engage and hold the consumable 204. The consumable 204 may include an aerosol-generating material 224 that may correspond to aerosol-generating material 124, and that may include one or more of each of a number of constituents such as an active substance, flavorant, aerosol-former material or other functional material. And the aerosol-generating material may be present on or in a support to form a substrate 226.

In the coupled configuration of the aerosol provision system 200, the consumable 204 may be held in the receiving chamber 220 in varying degrees. In some examples, less than half or approximately half of the consumable may be held in the receiving chamber 220. In other examples, more than half of the consumable 204 may be held in the receiving chamber 220. In yet other examples, substantially the entire consumable 204 may be held in the receiving chamber 220.

As shown in FIGS. 2B and 2C, in various implementations of the present disclosure, the consumable 204 may include a heated end 228 sized and shaped for insertion into the aerosol provision device 202, and a mouth end 230 upon which a user draws to create the aerosol. In various implementations, at least a portion of the heated end may include the aerosol-generating material 224.

In some example implementations, the mouth end 230 of the consumable 204 may include a filter 232 made of a material such as cellulose acetate or polypropylene. The filter may additionally or alternatively contain strands of tobacco containing material. In some examples, at least a portion of the consumable may be wrapped in an exterior overwrap material, which may be formed of any material useful to provide additional structure, support and/or thermal resistance. In some examples, an excess length of the overwrap at the mouth end of the consumable may function to simply separate the aerosol-generating material 224 from the mouth of a user or to provide space for positioning of a filter material, or to affect draw on the consumable or to affect flow characteristics of the aerosol leaving the consumable during draw.

The electric heater 206 may perform electric heating of the aerosol-generating material 224 by resistance (Joule) heating, induction heating, dielectric and microwave heating, radiant heating, arc heating and the like. The electric heater may have a variety of different configurations. In some examples, at least a portion of the electric heater may surround or at least partially surround at least a portion of the consumable 204 including the aerosol-generating material when inserted in the aerosol provision device 202. In other examples, at least a portion of the electric heater may penetrate the consumable when the consumable is inserted into the aerosol provision device. In some examples, the substrate 226 material may include a susceptor, which may be embedded within the aerosol-generating material, or on one or either side of the aerosol-generating material.

Although shown as a part of the aerosol provision device 202, the electric heater 206 may instead be a part of the consumable 504. In some examples, the electric heater or a part of the electric heater may be may be combined, packaged or integral with (e.g., embedded within) the aerosol-generating material 224.

As shown, in some examples, the electric heater 206 may extend proximate an engagement end of the housing 208, and may be configured to substantially surround a portion of the heated end 228 of the consumable 204 that includes the aerosol-generating material 224. The electric heater 206 may be or may include an outer cylinder 242, and one or more resistive heating elements 244 such as prongs surrounded by the outer cylinder to create the receiving chamber 220, which may extend from a receiving base 246 of the aerosol provision device to an opening 248 of the housing 208 of the aerosol provision device. In some examples, the outer cylinder may be a double-walled vacuum tube constructed of stainless steel so as to maintain heat generated by the resistive heating element(s) within the outer cylinder, and more particularly, maintain heat generated by the resistive heating element(s) within the aerosol-generating material.

Like the electric heater 206, the resistive heating element (s) 244 may have a variety of different configurations, and vary in number from one resistive heating element to a plurality of resistive heating elements. As shown, the resistive heating element(s) may extend from a receiving base 246 of the aerosol provision device 202. In some examples, the resistive heating element(s) may be located at or around an approximate radial center of the heated end 228 of the consumable 204 when inserted into the aerosol provision device. In some examples, the resistive heating element(s) may penetrate into the heated end of the consumable and in direct contact with the aerosol-generating material. In other examples, the resistive heating element(s) may be located inside (but out of direct contact with) a cavity defined by an inner surface of the heated end of the consumable.

In some examples, the resistive heating element(s) 244 of the electric heater 206 may be connected in an electrical circuit that includes the power source 210 such that electric current produced by the power source may pass through the resistive heating element(s). The passage of the electric current through the resistive heating element(s) may in turn cause the resistive heating element(s) to produce heat through resistance (Joule) heating.

In other examples, the electric heater 206 including the outer cylinder 242 and the resistive heating element(s) 244 may be configured to perform induction heating in which the outer cylinder may be connected in an electrical circuit that includes the power source 210, and the resistive heating element(s) may be connected in another electrical circuit. In this configuration, the outer cylinder and resistive heating element(s) may function as a transformer in which the outer cylinder is an induction transmitter, and the resistive heating element(s) is/are an induction receiver. In some of these examples, the outer cylinder and the resistive heating element(s) may be parts of the aerosol provision device 202. In other of these examples, the outer cylinder may be a part of the aerosol provision device, and the resistive heating element(s) may be a part of the consumable 204.

The outer cylinder 242 may be provided with an alternating current directly from the power source 210, or indirectly from the power source in which an inverter (as part of the circuitry 212) is configured to convert direct current from the power source to an alternating current. The alternating current drives the outer cylinder to generate an oscillating magnetic field, which induces eddy currents in the resistive heating element(s) 244. The eddy currents in turn cause the resistive heating element(s) to generate heat through resistance (Joule) heating. In these examples, the resistive heating element(s) may be wirelessly heated to form an aerosol from the aerosol-generating material 224 positioned in proximity to the resistive heating element(s).

In various example implementations, the aerosol provision device 202 may include an air intake 250 (e.g., one or more openings or apertures) in the housing 208 (and perhaps also the receiving base 246) to enable airflow into the receiving chamber 220. When a user draws on the mouth end 228 of the consumable 204, the airflow may be drawn through the air intake into the receiving chamber, pass into the consumable, and be drawn through the aerosol-generating material 224. The airflow may be detected by the sensor 214, and the electric heater 206 may be activated to energize the aerosol-generating material to generate an aerosol. The airflow may combine with the aerosol that is whisked, aspirated or otherwise drawn out an opening at the mouth end of the aerosol provision system. In examples including the filter 232, the airflow combined with the aerosol may be drawn out an opening of the filter at the mouth end.

Figure 3:
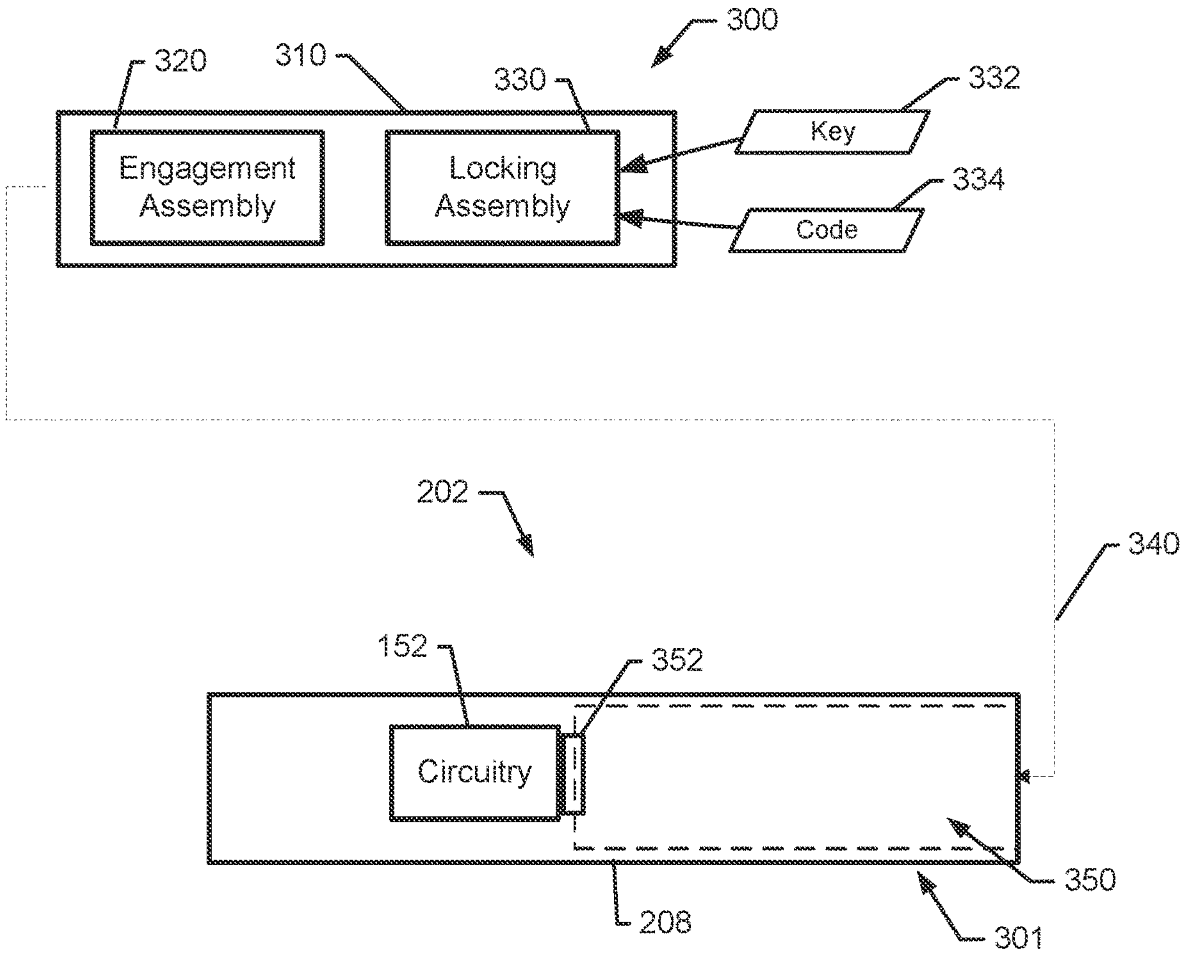
FIG. 3 is a block diagram of an example implementation a security device in accordance with an example embodiment.

As noted above, in order to avoid changes to the designs of aerosol generation devices themselves, while still improving the ability of such devices to avoid unauthorized usage, the addition of security features may be desirable. In some cases, the security features may be implemented by engagement of a separate security device with a portion of the aerosol provision system. FIG. 3 illustrates a block diagram of one example of a security device 300 that may be provided in order to engage with the one portion (e.g., the reusable part —) of the aerosol provision system 200.

The security device 300 of FIG. 3 may include a housing 310. The housing 310 may include (e.g., support, house, or otherwise be operably coupled to) an engagement assembly 320 and a locking assembly 330. The engagement assembly 320 may be configured to engage the aerosol provision device 202 in a way that prevents usage of the aerosol provision device 202 until the engagement assembly 320 has been properly removed. Meanwhile, the locking assembly 330 may be operably coupled to the engagement assembly 320 to allow (when the locking assembly 330 is shifted to an unlocked state) the proper removal of the engagement assembly 320 from the aerosol provision device 202 to enable operation of the aerosol provision device 202. The locking assembly 330 may also be operably coupled to the engagement assembly 320 in such a way as to prevent (when the locking assembly 330 is shifted to a locked state) removal of the engagement assembly 320 from the aerosol provision device 202 to correspondingly prevent operation of the aerosol provision device 202. Moreover, in some example embodiments, the engagement assembly 320 may be configured such that determined efforts to remove the engagement assembly 320 from the aerosol provision device 202 while the locking assembly 330 is in the locked state may ultimately destroy or otherwise render the aerosol provision device 202 inoperable. As such, the engagement assembly 320 and the locking assembly 330 may cooperate with each other relative to their engagement with the aerosol provision device 202 in order to act as a benefit denial security device relative to the aerosol provision device 202.

As can be appreciated from the description above, there are a number of ways the engagement assembly 320 may engage the aerosol provision device 202 to prevent usage of the aerosol provision device 202. In this regard, for example, the engagement assembly 320 could engage with or prevent operation of the circuitry 152 of the aerosol provision device 202 while the locking assembly 330 is in the locked state. Alternatively or additionally, the engagement assembly 320 could block or inhibit charging of the power source 210 of the aerosol provision device 202 while the locking assembly 330 is in the locked state. As yet another alternative or addition, the engagement assembly 320 may inhibit proper operation of a coupling interface 301 (electrically or mechanically) between the aerosol provision device 202 and consumable 204 to prevent the aerosol provision device 202 and consumable 204 from being operably coupled together. Still other options are also possible.

FIG. 3 illustrates a particular example in which the security device 300 is mated with the aerosol provision device 202 in such a way as to inhibit coupling of the aerosol provision device 202 to a consumable 204 without proper removal of the security device 300. In this regard, the housing 310 of the security device 300 mates with the coupling interface 301 of the aerosol provision device 202 while the locking assembly 330 is in the unlocked state. The engagement assembly 320 then electrically and/or mechanically engages with portions of the aerosol provision device 202 (e.g., the housing 208 and/or the circuitry 152) to inhibit connection of the consumable 204 to the coupling interface 301, and the locking assembly 330 is locked. The consumable 204 can thereafter not be operably coupled to the aerosol provision device 202 until the locking assembly 330 is unlocked, and the engagement assembly 320 is removed.

As can be appreciated from FIG. 3, the locking assembly 330 may be locked and/or unlocked in various different ways. For example, a key 332 and/or a code 334 may be provided to the locking assembly 330 to shift the locking assembly 330 between states. In some cases, the code 334 may be entered into the locking assembly 330 manually or electronically. For example, the code 334 may be manually entered into a combination lock in which case, the code 334 is the correct combination for unlocking the combination lock. However, in some embodiments, the code 334 may be an optical, audio or radio signal configured to unlock the locking assembly 330. In such embodiments, the code 334 may be a particular signal, pattern, and/or the like, which unlocks the locking assembly 330.

The key 332 may also take different forms. In this regard, in some cases, the key 332 may be a physical key insertable into a pin tumbler, wafer tumbler, disc tumbler, or other such lock. However, in other examples, the key 332 may be magnetic and, for example, may be configured to have a unique shape such that the magnetic force exerted by the key 332 for transitioning the locking assembly 330 to the unlocked state can only be provided with the properly shaped key 332 being used. Other forms of the key 332 are also possible.

As noted above, the engagement assembly 320 may be configured to engage with the housing 208 and/or the circuitry 152 of the aerosol provision device 202 (among other possible ways of engaging). In some cases, both of these forms of engagement may be accomplished via insertion of the housing 310 of the security device 300 into a portion of the coupling interface 301. Such insertion is generally shown by the arrow 340 in FIG. 3. As an example, the coupling interface 301 may include a receiving chamber 350 formed by the housing 208 (e.g., defined by one or more walls therein) of the aerosol provision device 202. The receiving chamber 350 (at least at one end thereof) may generally be sized and formed to *mate* with the consumable 204 for normal operation of the aerosol provision system 200. Other portions of the housing 208 may extend around lateral sides of the aerosol provision device 202. The engagement assembly 320 (which may define a portion of the housing 310 or be attached thereto) and/or the housing 310 may be sized and formed to *mate* with the receiving chamber 350 in similar fashion to the way the consumable 204 mates with the receiving chamber 350, and do so instead of (and at the exclusion of) the consumable 204.

In such an example, the engagement assembly 320 may be inserted into the receiving chamber 350 and the locking assembly 330 may be transitioned to the locked state thereby rigidly coupling or affixing the receiving chamber 350 to the engagement assembly 320. The consumable 204 can therefore not be inserted into the receiving chamber 350 due to the engagement assembly 320 blocking access thereto. When the key 332 or code 334 is provided to the locking assembly 330 to shift the locking assembly 330 to the unlocked state, the engagement assembly 320 may be removable from the receiving chamber 350 to enable the consumable 204 to be inserted therein. However, if an unauthorized user attempts to remove security device 300 from the receiving chamber 350 without first unlocking the locking assembly 330, such removal will be prevented by the engagement assembly 320 for as long as the locking assembly 330 is in the locked state. In this regard, the engagement assembly 320 will remain engaged with the receiving chamber 350 in spite of any efforts involving normal forces associated with removing the security device 300 from engagement with the receiving chamber 350. To the extent a determined effort to remove the security device 300 is employed by the unauthorized user (e.g., using tools or high amounts of force), the security device 300 is configured to perform the benefit denial function as described above. For example, the engagement assembly 320 may be configured to damage the receiving chamber 350 (e.g., by damaging one or more walls of the receiving chamber) to prevent the receiving chamber 350 from properly engaging the consumable 204. FIGS. 4A-4E below illustrate one example structure in which the engagement assembly 320 may be configured in this way.

As an alternative to damaging the receiving chamber 350, the engagement assembly 320 may be configured to be destroyed (by the excessive use of force) in such a manner that disables the aerosol provision device 202 without destroying the receiving chamber. In this regard, for example, the engagement assembly 320 may be designed with a failure mode that leaves a portion thereof inside the receiving chamber 350 to block access to the receiving chamber 350, but also further inhibit removal of the engagement assembly 320 from the receiving chamber 350 without rendering the receiving chamber 350 (or other portions of the aerosol provision device 202) unusable. FIGS. 5A-5I below illustrate one example structure in which the engagement assembly 320 may be configured in this way.

As yet another alternative, the engagement assembly 320 may be configured to engage with an electronic interface 352 of the coupling interface 301. In such an example, the engagement assembly 320 may be configured to disable or destroy the electronic interface 352 when the engagement assembly 320 is forcibly removed (or attempted to be removed) from the receiving chamber 350. In this regard, as shown in FIG. 3, the electronic interface 352 may be positioned within the receiving chamber 350 to interface with the consumable 204 when the consumable 204 is inserted into the receiving chamber 350. As an example, the electronic interface 352 may include electrical connectors (e.g., posts, wires, leads, contacts, etc.) that operably couple the circuitry 152 and/or power source 210 to the heating element 244 in the consumable 204. In some examples, the engagement assembly 320 may be configured to engage with the electronic interface 352 in such a way that the electronic interface 352 is destroyed or rendered non-operational if the engagement assembly 320 is removed without first having the locking assembly 330 shifted to the unlocked state. For example, the engagement assembly 320 may destroy a post, wire, lead or contact of the electronic interface 352 if the engagement assembly 320 is attempted to be removed without first unlocking the locking assembly 330. FIGS. 6A-6F below illustrate one example structure in which the engagement assembly 320 may be configured in this way.

Referring now to FIG. 4, which is defined by FIGS. 4A-4E, an example implementation of security device 300' will be described in greater detail. In this regard, the security device 300' is implemented with a combination lock 400 that operates as the locking assembly 330, and other structures forming the engagement assembly 320. Notably, however, other forms of locking assembly 330 could alternatively be employed. FIG. 4A shows a perspective view of the security device 300' in isolation. FIG. 4B illustrates a perspective view of the security device 300' with half of a lock body 440 of the combination lock 400 removed. Meanwhile, FIGS. 4C, 4D and 4E each illustrate different perspective views of the security device 300' while inserted into the receiving chamber 350. Notably, remaining portions of the aerosol provision device 202 are not shown in order to allow visibility of portions of the security device 300' that interface with the receiving chamber 350.

The engagement assembly 320 of the security device 300' includes a latch assembly 410 and a tensioning assembly 420. The latch assembly 410 is operably coupled to a locking shaft 430 that extends into a lock body 440 of the combination lock 400. Other parts of the locking assembly 330 (e.g., combination lock 400) of this example includes one or more wheels 442 that are rotatable relative to the lock body 440. The locking shaft 430 includes teeth 432 that interface with the wheels 442 to retain the locking shaft 430 in the locked state until the wheels 442 are aligned with positions corresponding to the code 334. Two of the wheels 442 are removed from the lock body 440 in this example to facilitate visibility inside the lock body 440, and of the teeth 432. When the code 334 is entered via the rotating and repositioning of the wheels 442, the locking shaft 430 is released to the unlocked state.

The latch assembly 410 includes a first latch set 412 and a second latch set 414. The first and second latch sets 412 and 414 of this example each include two latch members (e.g., cams or lobes). However, either one latch member or more latch members could be used in alternative embodiments. The first and second latch sets 412 and 414 are each mounted on a set of pins 416 that also pass through corresponding portions of the locking shaft 430. In this example, the first latch set 412 is positioned with one latch member on each opposing side of the locking shaft 430, and adjacent thereto. Meanwhile, the second latch set 414 is positioned such that each latch member of the second latch set 414 is adjacent to a corresponding one of the latch members of the first latch set 412 again on opposite sides of the locking shaft 430 (and therefore outwardly from the first latch set 412 with respect to the locking shaft 430). Each of the latch members of the first and second latch sets 412 and 414 has a corresponding detent 418, and the detents 418 of the first and second latch sets 412 and 414 are extended in opposite directions. Meanwhile, the receiving chamber 350 of this example includes latch receivers 450 disposed on opposing sides of the receiving chamber 350 to receive the corresponding detents 418 of the latch assembly 410 when the locking shaft 430 is in the locked state. However, no such latch receivers 450 are necessary, and friction may be generated between the receiving chamber 350 and the latch assembly 410 without any such receivers in some embodiments.

The tensioning assembly 420 includes tensioning wires 422 that extend from the lock body 440 to a portion of the latch members of each of the first and second latch sets 412 and 414. When the locking shaft 430 is in the locked state, pulling on the lock body 440 applies force to the first and second latch sets 412 and 414 through the locking shaft 430. Applying force through the locking shaft 430 causes the first and second latch sets 412 and 414 to press harder against the receiving chamber 350 and dramatically increase how hard it is to remove the latch assembly 410 from the receiving chamber 350. When the locking shaft 430 is in the unlocked state, the locking assembly 330 is able to translate a small distance away from the engagement assembly 320 due to the locking shaft 430 now being free to move within the locking assembly 330. This small translation takes the slack out of the tensioning wires 422 and puts the tensioning wires 422 under tension as the locking assembly 330 is pulled, preventing force from being applied through the locking shaft 430. The tension in the tensioning wires 422 applies force to the first and second latch sets 412 and 414 in such a way that the first and second latch sets 412 and 414 contract and apply less friction to the receiving chamber 350. With less friction, the first and second latch sets 412 and 414 can be be withdrawn from the receiving chamber 350 without damaging the receiving chamber 350.

As noted above, the locking assembly 330 and the engagement assembly 320 may also be functionally and structurally configured in other ways. In this regard, FIG. 5, which is defined by FIGS. 5A, 5B, 5C, 5D, 5E, 5F, 5G, 5H and 5I, shows an example of security device 300" with a different structure used for the engagement assembly 320, but a similar structure (i.e., combination lock 500) for the locking assembly 330. FIGS. 5A and 5B shows the security device 300" attached to the receiving chamber 350. FIGS. 5C and 5D illustrate perspective views of the security device 300" in isolation (i.e., removed from the receiving chamber 350). FIG. 5E illustrates a perspective view of the security device 300" with half of the lock body 540 of the combination lock 500 removed. FIG. 5F shows one of the engagement bodies of the engagement assembly 320 removed. FIG. 5G is a cross sectional view taken along a longitudinal axis of the security device 300", and FIG. 5H is also a cross sectional view taken along the longitudinal axis, but rotated 90 degrees relative to FIG. 5G. FIG. 5I is a cross sectional view through engagement bodies of the engagement assembly 320 taken along a plane that is substantially perpendicular to the longitudinal axis.

Similar to the example embodiment described in reference to FIG. 4, the locking assembly 330 (e.g., combination lock 500) of this example includes a locking shaft 530, a lock body 540 and one or more wheels 542 that are rotatable relative to the lock body 540. The locking shaft 530 includes teeth 532 that interface with the wheels 542 to retain the locking shaft 530 in the locked state until the wheels 542 are aligned with positions corresponding to the code 334. Two of the wheels 542 are removed from the lock body 540 in this example to facilitate visibility inside the lock body 540, and of the teeth 532. When the code 334 is entered via the rotating and repositioning of the wheels 542, the locking shaft 530 is released to the unlocked state. In the unlocked state, the combination lock 500 is able to move away from the receiving chamber 350 to create space (i.e., separation) between the locking assembly 330 (e.g., combination lock 500) and the engagement assembly 320 in a direction shown by arrow 550. While this separation occurs, the engagement assembly 320 components remain fixed within the receiving chamber 350, but the combination lock 500 moves away from both the receiving chamber 350 and the engagement assembly 320.

The separation created enables the combination lock 500 to be rotated (as shown by arrow 552), which in turn carries the locking shaft 530 to also turn the locking shaft 530 in the direction shown by arrow 552. Within the lock body 540, a shaft translation gap 543 is formed, which defines the amount of translation of the locking shaft 530 that is enabled when the combination lock 500 is unlocked. When the locking shaft 530 has moved (in the direction of arrow 550) through the shaft translation gap 543, enough separation is created to allow the combination lock 500 (and the lock body 540) to be rotated in the direction of arrow 552 to thereby turn the locking shaft 530 relative to the engagement assembly 320, which remains fixed in the receiving chamber 350 at this time (i.e., before the locking shaft 530 and lock body 540 have been rotated). Before the lock body 540 of the combination lock 500 has been rotated (along with the locking shaft 530), the locking shaft 530 may be considered to be in an aligned position. After rotation of the lock body 540 of the combination lock 500 relative to the receiving chamber 350 (e.g., in the direction of arrow 552), the locking shaft 530 may be considered to be in a rotated position.

The engagement assembly 320 of this example embodiment includes a first engagement body 510 and a second engagement body 512, which are configured to mirror each other, and be disposed on opposing sides of an engagement shaft 520. The engagement shaft 520 is rotatable between the first and second engagement bodies 510 and 512 based on a position of the locking shaft 530 (i.e., based on whether the locking shaft 530 is in the aligned position or the rotated position). The locking shaft 530 may be operably coupled to the engagement shaft 520 such that rotation of the locking shaft 530 correspondingly carries the engagement shaft 520 when the locking shaft 530 is rotated after sufficient separation has been created by unlocking the combination lock 500 and creating separation by movement in the direction of arrow 550 as described above. In this regard, in the locked state of the combination lock 500, both the locking shaft 530 and the engagement shaft 520 are in the aligned position. In the unlocked state of the combination lock 500, after sufficient space has been created by movement of the lock body 540 away from the first and second engagement bodies 510 and 512 (e.g., in the direction of arrow 550) to traverse the shaft translation gap 543, as described above, the locking shaft 530 and therefore also the engagement shaft 520 may be rotated (in the direction of arrow 552) to the rotated position.

The first and second engagement bodies 510 and 512 may be held proximate to the locking shaft 530 by a first O-ring 534 and a second O-ring 536 (e.g., forming a biasing assembly). The first and second O-rings 534 and 536 may be embodied as flexible members that are under tension when the engagement shaft 520 is in the aligned position. In this regard, the engagement shaft 520 may have a diameter (at least at a portion thereof) that is large enough to separate the first and second engagement bodies 510 and 512 against the biasing force of the first and second O-rings 534 and 536. Moreover, in some cases, the second O-ring 536 may be larger than the first O-ring 534, and the second O-ring 536 may be configured to engage (e.g., frictionally) the inside of the receiving chamber 350, when tensioned. Accordingly, when the engagement shaft 520 is in the aligned position, the first and second O-rings 534 and 536 may each be under tension due to the engagement shaft 520 pushing the first and second engagement bodies 510 and 512 apart from each other against the tension of the first and second O-rings 534 and 536. When tensioned, the second O-ring 536 (and perhaps also or alternatively the first O-ring 534) expand and frictionally engage the inside of the receiving chamber 350 to retain the engagement assembly 320 in the receiving chamber 350.

As best shown in FIG. 5I, the first and second engagement bodies 510 and 512 may each have a reception cavity 514 formed therein. The reception cavities 514 may face toward each other on opposite sides of the engagement shaft 520. Moreover, the reception cavities 514 may be sized and shaped to correspond to a shape a portion of the engagement shaft 520 such that, when the engagement shaft 520 is rotated to the rotated position (e.g., by rotation of the locking shaft 530 in the direction of arrow 552), the portion of the engagement shaft 520 that corresponds to the reception cavities 514 is aligned therewith. The alignment of the reception cavities 514 with the portion of the engagement shaft 520 that is shaped to correspond to the shape of the reception cavities 514 allows the distance between the first and second engagement bodies 510 and 512 to decrease. The decreased distance between the first and second engagement bodies 510 and 512 correspondingly reduces the tension on the first and second O-rings 534 and 536. The reduced tension (which may be considered an un-tensioned state for the first and second O-rings 534 and 536) correspondingly reduces the friction that the second O-ring 536 exerts on the inside of the receiving chamber 350. The engagement assembly 320 may therefore be removed from the receiving chamber 350.

Notably, the engagement shaft 520 and the locking shaft 530 of this example are operably coupled to each other via a mechanical fuse member, such as, for example, a shear pin 580. The shear pin 580 may extend through a proximal end of the locking shaft 530 (relative to the engagement shaft 520), and also through a portion of the engagement shaft 520. The shear pin 580 may be configured to handle any normal forces associated with shifting between the aligned position and the rotated position of the locking shaft 530 and the engagement shaft 520. However, if excessive forces are exerted on the shear pin 580 (e.g., either in translational or rotational directions), the shear pin 580 may be configured to break and thereby enable complete separation of the lock body 540 from the first and second engagement bodies 510 and 512 of the engagement assembly 320. As such, the engagement assembly 320 and the locking assembly 340 may be physically disconnected from each other with the engagement assembly 320 still affixed (presumably permanently) in the receiving chamber 350. This provides a benefit denial function by making it impossible to load the consumable 204 into the receiving chamber 350. As can best be seen in FIGS. 5G and 5H, a cap member 582 may be provided at an end of the first and second engagement bodies 510 and 512 that is proximate to the combination lock 500. The cap member 582 may restrict access to the engagement shaft 520 to prevent manipulation thereof if the shear pin 580 has been destroyed, thereby attempting to make the benefit denial function permanent.

As mentioned above, in some implementations the engagement assembly 320 may be configured to engage with the electronic interface 352 of the coupling interface 301, and the engagement assembly 320 may be configured to disable or destroy the electronic interface 352 when the engagement assembly 320 is forcibly removed (or attempted to be removed) from the receiving chamber 350 without proper unlocking. FIG. 6, which is defined by FIGS. 6A, 6B, 6C, 6D, 6E and 6F, shows another alternative example of a security device 300''' in accordance with an example embodiment. FIG. 6A illustrates a perspective view of the security device 300''' attached within the receiving chamber 350 of the aerosol provision device 202 (i.e., in similar fashion to how an instance of the consumable 204 would attach). FIG. 6B shows a similar perspective to that of FIG. 6A except that the housing is removed to expose portions of the security device 300''' that engage the electronic interface 352 of the aerosol provision device 202. FIG. 6C is a partially exploded view of some parts of the security device 300'''. FIG. 6D is a perspective view of a lifting member of the security device 300'''. FIG. 6E is a perspective view of the electronic interface 352 in isolation, and FIG. 6F is a cross section view taken through the lifting member and a portion of the electronic interface 352.

Referring now to FIG. 6, the electronic interface 352 may include contact posts 600 (or power pins). The contact posts 600 may be electrically connected to the heating element 244 of the consumable 204 when the consumable 204 is inserted into the receiving chamber 350. As such, the contact posts 600 may transfer power from the power source 210 and/or circuitry 152 of the aerosol provision device 202 to the heating element 244. The contact posts 600 may therefore be connected electrically to the circuitry 152 and/or power source 210 under normal conditions.

The security device 300''' may include a lifting member 610 that is configured to engage one of the contact posts 600 when the security device 300''' is fully inserted into the receiving chamber 350. The lifting member 610 may be attached to a housing 612 of the security device 300''' (directly or indirectly) via a living hinge 614. The living hinge 614 may enable the lifting member 610 to pivot in the direction shown by arrow 620. However, the living hinge 614 may have a relaxed state (i.e., not pivoted), which is shown in FIGS. 6B, 6C, 6D and 6F. The lifting member 610 may also include a lifting arm 616 that is attached to a portion of the lifting member 610 such that application of upward force (e.g., in the direction shown by arrow 622) will cause the living hinge 614 to pivot as shown by arrow 620.

In an example embodiment, the security device 300''' may include a shape-memory member 630 that may be positioned within the housing 612 to be poised to apply the upward force to the lifting arm 616 when the shape-memory member 630 is activated. The shape-memory member 630 may be made of a shape-memory alloy (e.g., nitinol or the like) that may be referred to as "muscle wire." The normal or relaxed shape of the shape-memory member 630 may not place any upward force on the lifting arm 616. However, when current is applied to the shape-memory member 630, the shape-memory member 630 may contract, thereby applying the lifting force to the lifting arm 616 to cause the living hinge 614 to pivot in the direction shown by arrow 620. Current for contraction of the shape-memory member 630 may be provided from a charging source. In this regard, for example, the security device 300''' may include a charging interface 650 and a circuit board 652 that may be configured to receive and apply power to the shape-memory member 630.

When engaged with one of the contact posts 600, and while the shape-memory member 630 is not contracted, the lifting member 610 may effectively be wedged into contact with opposing sides of the contact post 600 to which the lifting member 610 is attached. FIG. 6F shows this condition. As such, when a force aimed at removing the security device 300''' from the receiving chamber 350 is provided while the shape-memory member 630 is not contracted, the edges 640 of the lifting member 610 will grip the contact post 600 and cause the force to be applied to the contact post 600 and, if sufficient, to damage electrical connections to the contact post 600 to create an electrical open circuit. The electrical interface 352 may therefore be damaged to the point at which the consumable 204, even it properly installed after removal of the security device 300''', will not be operable since the contact post 600 is electrically isolated and open circuited.

However, when the shape-memory member 630 is contracted, and the lifting arm 616 is lifted such that the living hinge 614 pivots, the edges 640 of the lifting member 610 that are shown to engage the contact post 600 in FIG. 6F will disengage the contact post 600. This may enable the security device 300''' to be removed from the tube 350 without any damage to the aerosol provision device 202 (or the electronic interface 352).

The locking assembly 330 of the example of FIG. 6 may employ a wireless key or code. For example, the locking assembly 330 may be configured to be unlocked via the application of the code 334 via an audible, optical or other electrical signal to the circuit board 652. The example of FIG. 7 illustrates another embodiment in which a wireless key or code is used to operate the locking assembly 330. FIG. 7 is defined by FIGS. 7A, 7B, 7C, 7D and 7E. In this regard, FIG. 7A illustrates a perspective view of the device 700, and FIG. 7B illustrates a perspective view of the device 700 with a housing thereof removed to expose the circuit board 712 thereof. FIG. 7C is an exploded view of the engagement assembly 320 of this example embodiment, and FIG. 7D illustrates a partially assembled view of a movable spacer of an example embodiment. FIG. 7E illustrates a cross section view through the device 700 in the unlocked (or release) condition.

FIG. 7 illustrates a wirelessly activated security device 700. The device 700 may include a receiving element 710 that is configured to receive the optical, electrical or audible signal (e.g., code 334 or key 332). A circuit board 712 may be operably coupled to the receiving element 710 and include processing circuitry configured to process the code 334 or key 332 upon receipt. If the code 334 or key 332 is authentic, the processing circuitry on the circuit board 712 may change the state of the device 700 from locked to unlocked. Unlocking of the device 700 may then include the communication of a signal or trigger to the engagement assembly 320. The engagement assembly 320 of this example may include a first engagement body 720 and a second engagement body 722, which may be held proximate to each other by a first O-ring 730 and second O-ring 732 in a manner similar to that described above in reference to FIG. 5. As such, first and second O-rings 730 and 732 may be similar in both form and function to the first and second O-rings 534 and 536 described above. The first and second engagement bodies 720 and 722 may also be similar to the first and second engagement bodies 510 and 512 described above, except that the first and second engagement bodies 720 and 722 may be separated from each other by a movable spacer 740 instead of by the engagement shaft 520. Moreover, in this example, only one of the first engagement body 720 or the second engagement body 722 may include one or more reception cavities 750. The other of the first engagement body 720 or the second engagement body 722 may include projections 752 that are shaped to correspond to the reception cavity (or cavities) 750, and are substantially aligned therewith.

The movable spacer 740 may include through holes 760 that correspond to the one or more reception cavities 750 in shape. The movable spacer 740 may be movable (e.g., slidable) in its position between the first and second engagement bodies 720 and 722 into and out of a position of alignment between the through holes 760 and the reception cavities 750 (and projections 752). When the movable spacer 740 is out of alignment with the reception cavities 750 and the projections 752, the movable spacer 740 may prevent the projections 752 from moving into and engaging the reception cavities 750 (responsive to urging from the first and second O-rings 730 and 732). When the movable spacer 740 is in alignment with the reception cavities 750 and the projections 752, the movable spacer 740 may allow the projections 752 to pass through the through holes 760 in order to move into and engage the reception cavities 750 (responsive to urging from the first and second O-rings 730 and 732).

The out of alignment condition may be referred to as a retention condition (or locked condition) in which the first and second engagement bodies 720 and 722 are spaced apart from each other by a first distance, which is defined by the width of the movable spacer 740 and the amount of extension of the projections 752. The in alignment condition may be referred to as a release condition (or unlocked condition) in which the first and second engagement bodies 720 and 722 are spaced apart from each other by a second distance defined only by the width of the movable spacer 740 (and therefore smaller than the first distance). When the movable spacer 740 is in the release condition, the first and second O-rings 730 and 732 may compress the first and second engagement bodies 720 and 722 (as shown in FIG. 7E) such that the second O-ring 732 does not place sufficient frictional pressure on the wall(s) of the receiving chamber 350 to retain the engagement assembly 320 in the receiving chamber 350. However, since the first distance is greater than the second distance, when the movable spacer 740 is in the retention condition, the first and second engagement bodies 720 and 722 may cause at least the second O-ring 732 to place sufficient frictional pressure on the wall(s) of the receiving chamber 350 to retain the engagement assembly 320 in the receiving chamber 350.

Movement of the moveable spacer 740 between the retention condition and the release condition may be performed based on the application of current to a shape-memory member 770. The shape-memory member 770 may normally not be contracted, and the moveable spacer 740 may be biased to be in the retention condition. By applying power to the shape-memory member 770, the shape-memory member 770 may be caused to contract and lift the moveable spacer 740 in the direction of arrow 780 to the release condition. In some cases, the moveable spacer 740 may only be moved once in this manner (and partial disassembly may be required to reset the configuration for subsequent operation). However, in other cases, a biasing assembly may be included and configured such that when power is removed, the moveable spacer 740 may move back to the retention condition. The power may be provided from a charging source and/or under control of the processing circuitry of the circuit board 712, as described above. Meanwhile, the shape-memory member 770 or another component connected thereto (e.g., wires connecting the locking assembly 330 to the engagement assembly 320) may be breakable to separate the locking assembly 330 from the engagement assembly 320 in response to application of force to remove the device 700 from the tube 350 of the aerosol provision device 202 while the locking assembly 330 is in the locked state. As described above, this would leave the engagement assembly 320 permanently in the tube 350 to prevent usage of the aerosol provision device 202 with the consumable 204.

FIG. 8 illustrates a block diagram of a method of preventing unauthorized use of an aerosol generation device in accordance with an example embodiment. The method may include applying a security device having an engagement assembly and a locking assembly to a portion of the aerosol generation device to which a consumable cartridge is otherwise attachable at operation 800. The method may further include transitioning the locking assembly to a locked state in which the engagement assembly is affixed to the portion of the aerosol generation device at operation 810. The method may further include, responsive to receipt of a key or code, transitioning the locking assembly to an unlocked state in which the engagement assembly is released from being affixed to the portion of the aerosol generation device at operation 820. The method may also include performing a benefit denial function responsive to removal of the security device from the aerosol generation device when the locking assembly is in the locked state at operation 830. The benefit denial function therefore only happens when the corresponding triggering conditions (i.e., removing the security device when the locking assembly is not unlocked) are present.

Some example embodiments may provide security against unauthorized use of an aerosol generation/provision device without requiring any other structural or software changes to the device. Accordingly, as can be appreciated from the examples above, a security device for an aerosol generation device may be provided. The security device may include an engagement assembly configured to releasably engage a portion of the aerosol generation device and a locking assembly operably coupled to the engagement assembly. The locking assembly may be configured to have a locked state in which the engagement assembly is affixed to the portion of the aerosol generation device, and an unlocked state in which the engagement assembly is released from being affixed to the portion of the aerosol generation device. The engagement assembly may be further configured to perform a benefit denial function responsive to removal of the security device from the aerosol generation device.

The security device may include a number of modifications, augmentations, or optional additions, some of which are described herein. The modifications, augmentations or optional additions listed below may be added in any desirable combination. Within this context, the security device as described above may be considered a first embodiment, and other embodiments may be defined by each respective combination of modifications, augmentations or optional additions. For example, a second embodiment may be defined in which the aerosol generation device includes a control unit to which a consumable cartridge is attachable. The portion of the aerosol generation device may include a coupling interface at the control unit at which the cartridge attaches to the control unit, and the engagement assembly may be configured to prevent operable coupling of the cartridge to the control unit when the engagement assembly is affixed to the coupling interface. Alternatively or additionally, a third embodiment may be defined in which the coupling interface includes an electrical interface between a power supply in the control unit and a heater element in the cartridge, and the benefit denial function includes rendering the electrical interface inoperable. In an example embodiment, a fourth embodiment may be defined in which the engagement assembly includes a lifting member configured to engage opposing sides of a post of the electrical interface, and a shape-memory member is operably coupled to the lifting member. The shape-memory member may be configured to align the lifting member for removal from the post when the locking assembly is in the unlocked state, and the shape-memory member may be configured to cause the lifting member to electrically disconnect the post from electronics of the control unit responsive to removal of the security device when the locking assembly is in the locked state. The fourth embodiment may be combined with any or all of embodiments one to three. In some examples, a fifth embodiment may be defined in which the coupling interface includes a receiving chamber into which the cartridge is insertable to operably couple the cartridge to the control unit, and the benefit denial function includes damaging the receiving chamber. The fifth embodiment may be combined with any or all of embodiments one to four. In an example embodiment, a sixth embodiment may be defined in which the engagement assembly includes a latch assembly and a spring assembly. The spring assembly may be configured to be tensioned to retain the latch assembly affixed to the tube responsive to the locking assembly being in the locked state, and the spring assembly may be configured to be de-tensioned to release the latch assembly from the tube responsive to the locking assembly being in the unlocked state. The sixth embodiment may be combined with any or all of embodiments one to five. In some examples, a seventh embodiment may be defined in which the coupling interface includes a receiving chamber into which the cartridge is insertable to operably couple the cartridge to the control unit, and the benefit denial function includes enabling separation of the locking assembly from the engagement assembly thereby leaving the engagement assembly affixed to the tube to prevent operable coupling of the cartridge to the control unit. The seventh embodiment may be combined with any or all of embodiments one to six. In an example embodiment, an eighth embodiment may be defined in which the engagement assembly includes a first engagement body and a second engagement body disposed on opposing sides of an engagement shaft. The locking assembly may include a locking shaft translatable in a direction substantially parallel to a longitudinal axis of the security device when the locking assembly is in the unlocked state. The locking assembly may be translatable away from the tube and the first and second engagement bodies when the locking assembly is in the unlocked state. Responsive to translating the locking assembly away from the receiving chamber and the first and second engagement bodies, the locking assembly may be configured to rotate relative to the engagement assembly and the receiving chamber thereby rotating the locking shaft from an aligned position to a rotated position. The eighth embodiment may be combined with any or all of embodiments one to seven. In some examples, a ninth embodiment may be defined in which the locking shaft is configured to carry the engagement shaft during rotation of the locking shaft. The first and second engagement bodies may be urged toward each other by a biasing assembly, and the engagement shaft may separate the first and second engagement bodies by a first distance when the locking shaft and engagement shaft are in the aligned position, and by a second distance, smaller than the first distance, when the locking shaft and engagement shaft are in the rotated position. The ninth embodiment may be combined with any or all of embodiments one to eight. In an example embodiment, a tenth embodiment may be defined in which the locking shaft and the engagement shaft are operably coupled to each other via a breakable mechanical fuse member, and the benefit denial function is executed responsive to breaking the mechanical fuse member. The tenth embodiment may be combined with any or all of embodiments one to nine. In some examples, an eleventh embodiment may be defined in which the engagement assembly further includes a cap member, and, when the mechanical fuse member breaks, access to the mechanical fuse member and the engagement shaft is restricted by the cap member. The eleventh embodiment may be combined with any or all of embodiments one to ten. In some examples, a twelfth embodiment may be defined in which the locking assembly may include a combination lock. The twelfth embodiment may be combined with any or all of embodiments one to eleven. In some examples, a thirteenth embodiment may be defined in which the locking assembly may be configured to transition between the locked state and the unlocked state responsive to receipt of a key or code. The thirteenth embodiment may be combined with any or all of embodiments one to twelve. In some examples, a fourteenth embodiment may be defined in which the key or code is received electronically, optically or audibly. The fourteenth embodiment may be combined with any or all of embodiments one to thirteen. In some examples, a fifteenth embodiment may be defined in which a shape-memory member is configured to contract to reposition a movable spacer in the unlocked state, the movable spacer may define a distance between a first engagement body and a second engagement body of the engagement assembly. The fifteenth embodiment may be combined with any or all of embodiments one to fourteen. In some examples, a sixteenth embodiment may be defined in which the shape-memory member is breakable to separate the locking assembly from the engagement assembly in response to application of force to remove the security device from the aerosol generation device while the locking assembly is in the locked state. The sixteenth embodiment may be combined with any or all of embodiments one to fifteen. In some examples, a seventeenth embodiment may be defined in which the first engagement body and the second engagement body are disposed on opposing sides of movable spacer. One of the first engagement body or the second engagement body may include a reception cavity, and the other of the first engagement body or the second engagement body may include a projection having a corresponding shape to the reception cavity and being substantially aligned therewith. The moveable spacer may include a through hole. The seventeenth embodiment may be combined with any or all of embodiments one to sixteen. In some examples, an eighteenth embodiment may be defined in which the through hole is not aligned with the reception cavity when the movable spacer is in a retention condition to prevent the projection from passing through the through hole into the reception cavity thereby separating the first and second engagement bodies by a first distance. The through hole may be aligned with the reception cavity when the movable spacer is in a release condition to enable the projection to pass through the through hole into the reception cavity thereby separating the first and second engagement bodies by a second distance. The first distance may be greater than the second distance. The eighteenth embodiment may be combined with any or all of embodiments one to seventeen. In some examples, a nineteenth embodiment may be defined in which the shape-memory member is in the retention condition when no current is applied to the shape-memory member, and the shape-memory member may be in the release condition when current is applied to the shape-memory member. The nineteenth embodiment may be combined with any or all of embodiments one to eighteen.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aerosol provision system comprising:

an aerosol provision device; and a security device connectable to the aerosol provision device, the security device configured to engage the aerosol provision device when the security device is connected to the aerosol provision device, and prevent use of the aerosol provision device as long as the security device is connected to the aerosol provision device, the security device switchable between a locked state in which the security device is respectively locked in engagement with the aerosol provision device—, an unlocked state in which the security device is allowed to disengage from the aerosol provision device to enable separation of the security device from the aerosol provision device.

2. The system of claim 1, wherein the security device is configured to receive a key or code, and switch between the locked state and the unlocked state based on the key or code.

3. The system of claim 1, wherein the aerosol provision device is usable to generate aerosol, and the security device is configured to prevent use of the aerosol provision device to generate aerosol when the security device is in the locked state.

4. The system of claim 1, wherein the aerosol provision device includes a coupling interface operable to enable engagement of the aerosol provision device with a consumable including aerosol-generating material, and the security device is configured to prevent operation of the coupling interface to enable the engagement of the aerosol provision device with the consumable when the security device is in the locked state.

5. The system of claim 1, wherein the aerosol provision device includes a receiving chamber structured to receive a consumable including aerosol-generating material, and wherein at least a portion of the security device is sized to fit in the receiving chamber when the security device is connected to the aerosol provision device, and the security device is configured to engage the receiving chamber of the aerosol provision device when the security device is in the locked state.

6. The system of claim 1, wherein the aerosol provision device includes circuitry operable to enable the aerosol provision device to generate aerosol, and the security device is configured to prevent operation of the circuitry to enable the aerosol provision device generate aerosol when the security device is in the locked state.

7. The system of claim 1, wherein the aerosol provision device includes a power source configured to power an aerosol generator to generate aerosol, and the security device is configured to prevent charging of the power source when the security device is in the locked state.

8. The system of claim 1, wherein the aerosol provision device includes a power source, and an electrical interface operable to electrically connect the power source to an aerosol generator, and wherein the security device is configured to prevent operation of the electrical interface.

9. The system of claim 1, wherein the security device is configured to damage or destroy the aerosol provision device responsive to an unauthorized use in which the security device is separated from the aerosol provision device while the security device is in the locked state in which the security device is locked in engagement with the aerosol provision device.

10. A security device connectable to an aerosol provision device, the security device comprising:

an engagement assembly configured to engage the aerosol provision device when the security device is connected to the aerosol provision device, and prevent use of the aerosol provision device as long as the security device is connected to the aerosol provision device; and a locking assembly operably coupled to the engagement assembly, the locking assembly switchable between a locked state in which the engagement assembly is locked in engagement with the aerosol provision device to prevent separation of the security device from the aerosol provision device, and an unlocked state in which the engagement assembly is allowed to disengage from the aerosol provision device to enable separation of the security device from the aerosol provision device.

11. The security device of claim 10, wherein the locking assembly is configured to receive a key or code, and switch between the locked state and the unlocked state based on the key or code.

12. The security device of claim 10, wherein the aerosol provision device is usable to generate aerosol, and the engagement assembly is configured to prevent use of the aerosol provision device to generate aerosol.

13. The security device of claim 10, wherein the aerosol provision device includes a coupling interface operable to enable engagement of the aerosol provision device with a consumable including aerosol-generating material, and the engagement assembly is configured to prevent operation of the coupling interface to enable the engagement of the aerosol provision device with the consumable.

14. The security device of claim 10, wherein the aerosol provision device includes a receiving chamber structured to receive a consumable including aerosol-generating material, and wherein at least a portion of the engagement assembly is sized to fit in the receiving chamber when the security device is connected to the aerosol provision device, and the engagement assembly is configured to engage the receiving chamber of the aerosol provision device.

15. The security device of claim 10, wherein the aerosol provision device includes circuitry operable to enable the aerosol provision device to generate aerosol, and the engagement assembly is configured to prevent operation of the circuitry to enable the aerosol provision device generate aerosol.

16. The security device of claim 10, wherein the aerosol provision device includes a power source configured to power an aerosol generator to generate aerosol, and the engagement assembly is configured to prevent charging of the power source.

17. The security device of claim 10, wherein the aerosol provision device includes a power source, and an electrical interface operable to electrically connect the power source to an aerosol generator, and wherein the engagement assembly is configured to prevent operation of the electrical interface.

18. The security device of claim 10, wherein the engagement assembly is configured to damage or destroy the aerosol provision device responsive to an unauthorized use in which the security device is separated from the aerosol provision device while the locking assembly is in the locked state in which the engagement assembly is locked in engagement with the aerosol provision device.

* * * * *